(12) United States Patent
Kikuchi

(10) Patent No.: US 7,730,224 B2
(45) Date of Patent: Jun. 1, 2010

(54) PROGRAM AND METHOD FOR MANAGING DEVICE DRIVER AND INFORMATION PROCESSING APPARATUS

(75) Inventor: Hiroshi Kikuchi, Musashino (JP)

(73) Assignee: Canon Kabushiki Kaisha (JP)

( * ) Notice: Subject to any disclaimer, the term of this patent is extended or adjusted under 35 U.S.C. 154(b) by 440 days.

(21) Appl. No.: 11/469,006

(22) Filed: Aug. 31, 2006

(65) Prior Publication Data

US 2007/0083679 A1  Apr. 12, 2007

(30) Foreign Application Priority Data

Sep. 1, 2005  (JP) .............................. 2005-253795

(51) Int. Cl.
 *G06F 3/00* (2006.01)
(52) U.S. Cl. .............................. 710/8; 710/10; 710/15; 710/17; 710/19; 710/40; 710/62
(58) Field of Classification Search ...................... 710/8, 710/10, 15, 17, 19, 40, 62
 See application file for complete search history.

(56) References Cited

U.S. PATENT DOCUMENTS

| 7,312,886 B2 * | 12/2007 | Gomi ........................ 358/1.15 |
| 2003/0154425 A1 | 8/2003 | Kim |
| 2004/0093491 A1 * | 5/2004 | Ebata ........................ 713/100 |
| 2005/0206938 A1 | 9/2005 | Oono |
| 2005/0240711 A1 * | 10/2005 | Watanabe .................... 710/313 |
| 2006/0122848 A1 * | 6/2006 | Takagi ............................ 705/1 |
| 2006/0168372 A1 * | 7/2006 | Smith et al. ................... 710/62 |

FOREIGN PATENT DOCUMENTS

| EP | 1 372 060 A2 | 12/2003 |
| JP | 2002-149362 | 5/2002 |
| JP | 2004-38956 | 2/2004 |
| JP | 2004-362594 | 12/2004 |
| JP | 2005-018363 A | 1/2005 |

OTHER PUBLICATIONS

European Search Report issued on Jan. 23, 2009 for Application No. 06119889.1-1243, which is a foreign counterpart to the present application. (11-pages).

* cited by examiner

*Primary Examiner*—Tariq Hafiz
*Assistant Examiner*—Jasjit S Vidwan
(74) *Attorney, Agent, or Firm*—Rossi, Kimms & McDowell LLP

(57) ABSTRACT

According to the present invention, an information processing apparatus which has a recognition function for recognizing connected peripheral devices and can make the connected peripheral devices available, comprises a holding unit adapted to hold the upper limit of device drivers to be installed, and an install controlling unit adapted to install device drivers by the upper limit held by the holding unit when device drivers corresponding to peripheral devices recognized by the recognition function are installed.

21 Claims, 22 Drawing Sheets

FIG. 6

| 301 | 302 | 303 | 304 | 305 | 306 | 307 | 308 | 309 |
|---|---|---|---|---|---|---|---|---|
| DRIVER | FREQUENCY OF USE | DATE AND TIME OF INSTALL | PRINT SPEED | COLOR PRINT | HIGHEST RESOLUTION | DRIVER DOWNLOAD | DOUBLE-SIDED PRINT | MANU-FACTURER |
| INSTALLED | ONCE OR MORE | WITHIN A WEEK | 10 ppm OR MORE | AVAILABLE | 150 dpi OR MORE | NEEDED | AVAILABLE | Company A |
| NOT INSTALLED | TWICE OR MORE | WITHIN A MONTH | 20 ppm OR MORE | UN-AVAILABLE | 300 dpi OR MORE | NOT NEEDED | UNAVAILABLE | Company B |
| | FIVE TIMES OR MORE | WITHIN THREE MONTHS | 30 ppm OR MORE | | 600 dpi OR MORE | | | Company C |
| | TEN TIMES OR MORE | WITHIN SIX MONTHS | 40 ppm OR MORE | | 1200 dpi OR MORE | | | Company D |
| | TWENTY TIMES OR MORE | WITHIN A YEAR | 50 ppm OR MORE | | 2400 dpi OR MORE | | | Company E |
| | FIFTY TIMES OR MORE | MORE THAN A WEEK | 60 ppm OR MORE | | 4800 dpi OR MORE | | | |
| | HUNDRED TIMES OR MORE | MORE THAN A MONTH | 70 ppm OR MORE | | 9600 dpi OR MORE | | | |
| | TWO HUNDRED TIMES OR MORE | MORE THAN THREE MONTHS | 80 ppm OR MORE | | | | | |
| | FIVE HUNDRED TIMES OR MORE | MORE THAN SIX MONTHS | 90 ppm OR MORE | | | | | |
| | THOUSAND TIMES OR MORE | MORE THAN A YEAR | 100 ppm OR MORE | | | | | |

FIG. 15

ADDING AND DELETING OF NETWORK PRINTER                               5000

NETWORK PRINTERS                                        5100

| PRINTER NAME | DRIVER STATUS |
|---|---|
| PRINTER 1050 FROM Company C | Installed |
| PRINTER 2020 FROM Company C | Installed |
| PRINTER 2040 FROM Company A | Installed |
| PRINTER 8050 FROM Company C | Installed |
| PRINTER 8040 FROM Company B | Discovered |
| PRINTER 5090 FROM Company B | Discovered |
| PRINTER 2030 FROM Company B | Discovered |
| PRINTER 5010 FROM Company C | Discovered |
| PRINTER 4080 FROM Company B | Discovered |
| PRINTER 2020 FROM Company A | Discovered |

1501

[ UPDATE LIST ]   [ ADD ]   [ DELETE ]
5200              5500  5300        5400

PROPERTY

PRINTER 1050 FROM Company C

| PROPERTY | VALUE |
|---|---|
| MANUFACTURER | Company C |
| MODEL | PRINTER 1050 |
| DOUBLE-SIDE | AVAILABLE |
| PRINT SPEED | 105ppm |

[ CLOSE ]

| PRINTER NAME | DRIVER (INSTALLED) | FREQUENCY OF USE (TEN TIMES OR MORE IN A WEEK) | DATE AND TIME OF INSTALL (WITHIN A MONTH) | PRINT SPEED (50 ppm OR MORE) | COLOR PRINT (AVAILABLE) | HIGHEST RESOLUTION (1200 dpi OR MORE) | DRIVER DOWNLOAD (NOT NEEDED) | DOUBLE-SIDED PRINT (AVAILABLE) | MANUFACTURER (Company C) |
|---|---|---|---|---|---|---|---|---|---|
| PRINTER 2020 FROM Company A | | | | | | | | | |
| PRINTER 2040 FROM Company A | ○ | ○ | | | | | | ○ | |
| PRINTER 2030 FROM Company B | | | ○ | | | ○ | ○ | | |
| PRINTER 4080 FROM Company B | | | | | ○ | | ○ | ○ | |
| PRINTER 5090 FROM Company B | | | ○ | ○ | | ○ | | ○ | |
| PRINTER 8040 FROM Company B | | ○ | ○ | ○ | ○ | ○ | | ○ | |
| PRINTER 1050 FROM Company C | ○ | ○ | ○ | ○ | ○ | ○ | ○ | ○ | ○ |
| PRINTER 2010 FROM Company C | ○ | | | | ○ | ○ | ○ | ○ | ○ |
| PRINTER 5010 FROM Company C | | | | ○ | | ○ | | ○ | ○ |
| PRINTER 8050 FROM Company C | ○ | | | ○ | ○ | ○ | ○ | | ○ |

FIG. 16B

| PRINTER NAME | DRIVER (INSTALLED) | FREQUENCY OF USE (TEN TIMES OR MORE IN A WEEK) | DATE AND TIME OF INSTALL (WITHIN A MONTH) | PRINT SPEED (50 ppm OR MORE) | COLOR PRINT (AVAILABLE) | HIGHEST RESOLUTION (1200 dpi OR MORE) | DRIVER DOWNLOAD (NOT NEEDED) | DOUBLE-SIDED PRINT (AVAILABLE) | MANUFACTURER (Company C) |
|---|---|---|---|---|---|---|---|---|---|
| PRINTER 1050 FROM Company C | ○ | ○ |   | ○ |   | ○ | ○ | ○ | ○ |
| PRINTER 2010 FROM Company C | ○ | ○ | ○ |   | ○ | ○ | ○ | ○ | ○ |
| PRINTER 2040 FROM Company A | ○ | ○ |   |   | ○ | ○ | ○ | ○ |   |
| PRINTER 8050 FROM Company C | ○ |   |   |   | ○ | ○ | ○ |   | ○ |
| PRINTER 8040 FROM Company B |   |   | ○ | ○ | ○ | ○ | ○ | ○ |   |
| PRINTER 5090 FROM Company B |   |   | ○ | ○ |   | ○ | ○ | ○ |   |
| PRINTER 2030 FROM Company B |   |   | ○ | ○ | ○ |   | ○ |   |   |
| PRINTER 5010 FROM Company C |   |   |   |   |   | ○ | ○ | ○ | ○ |
| PRINTER 4080 FROM Company B |   |   |   |   |   |   |   | ○ |   |
| PRINTER 2020 FROM Company A |   |   |   |   |   |   |   |   |   |

FIG. 17

| LIMIT VALUE | KEY RANKING | KEY | SET VALUE |
|---|---|---|---|
| 10 | 1 | DRIVER | INSTALLED |
| QUANTITY LIMIT FLAG | 2 | FREQUENCY OF USE | TEN TIMES IN A WEEK |
| | 3 | TIME PASSED AFTER INSTALL | ONE MONTH |
| AUTOMATIC INSTALL FLAG | 4 | PRINT SPEED | 50ppm |
| | 5 | COLOR PRINT | AVAILABLE |
| | 6 | HIGHEST RESOLUTION | 1200dpi |
| DRIVER DELETE FLAG | 7 | DRIVER DOWNLOAD | NOT NEEDED |
| | 8 | DOUBLE-SIDED PRINT | AVAILABLE |
| PRINTER LEAD FLAG | 9 | MANUFACTURER | Company C |

FIG. 18

| DEVICE ID | NAME | CONFIGURATION INFORMATION | DRIVER STATUS | POINT | HIGH-RANKING PRINTER FLAG |
|---|---|---|---|---|---|
| xxxx | PRINTER 1050 FROM Company C | ..... | Installed | 511 | 1 |
| yyyy | PRINTER 2010 FROM Company C | ..... | Installed | 479 | 1 |
| zzzz | PRINTER 2040 FROM Company A | ..... | Installed | 398 | 1 |
| aaaa | PRINTER 8050 FROM Company C | ..... | Installed | 317 | 1 |
| bbbb | PRINTER 8040 FROM Company B | ..... | Discovered | 126 | 1 |
| cccc | PRINTER 5090 FROM Company B | ..... | Discovered | 106 | 0 |
| dddd | PRINTER 2030 FROM Company B | ..... | Discovered | 84 | 0 |
| eeee | PRINTER 5010 FROM Company C | ..... | Discovered | 43 | 0 |
| ffff | PRINTER 4080 FROM Company B | ..... | Discovered | 2 | 0 |
| gggg | PRINTER 2020 FROM Company A | ..... | Discovered | 0 | 0 |

PROGRAM AND METHOD FOR MANAGING DEVICE DRIVER AND INFORMATION PROCESSING APPARATUS

BACKGROUND OF THE INVENTION

1. Field of the Invention

The present invention relates to a program and a method for managing device drivers of an information processing apparatus connected to a network, for example, an information processing apparatus.

2. Description of the Related Art

As networks such as the Internet or a home network expand, an interactive device such as a PDA or a cellular phone, an image processing apparatus such as a scanner, a printer, a copying machine, a digital camera or the like, for example, are network compatible. Various devices such as home electronic appliances such as a television, an air conditioner, a refrigerator and the like have also become network compatible. Accordingly, various protocols or architectures for providing functions of managing a network device to improve convenience in using a network compatible device and improve simplicity of management have been proposed (see Patent Documents 1, 2). The provided functions include an automatic setup of application software, utility software, an operating system and the like for searching a network device for providing a service or controlling a network device, for example.

Automating management of a network device has also been tried. For example, Microsoft Corporation has been promoting development of the UPnP (Registered trademark), and the WSD: Web Services for Devices (WS-Discovery/WS-MetadataExchange). That is for realizing so-called plug-and-play to make a device available just by connecting the device to a network. BMLinks (registered trademark) promoted by Japan Business Machine and the Information System Industries Association (JBMIA), Rendezvous supported by OS X developed by Apple Computer Inc. are also known.

A technique for presenting to a user the presence of right to use, recommendation or the like which is a criterion for selecting a printer by listing the searched printers when many printers are searched at searching of a network compatible printer has also been proposed (Patent Document 3).

[Patent Document 1] Japanese Patent Application Laid Open No. 2004-038956.

[Patent Document 2] Japanese Patent Application Laid-Open No. 2004-362594.

[Patent Document 3] Japanese Patent Application Laid-Open No. 2002-149362.

As plug and play has begun to prevail in network devices, however, the convenience is improved but harmful effects also occur. One of the harmful effects is that a driver or an application program of a network device is installed without regard for user's needs.

Particularly, it is assumed that a handheld computer or the like is connected to an environment where a great number of printers are connected on a network such as in a large office or the like. In such a case, each time a plug and play function works and a network device running on the network is found, a driver or an application program of the network device are installed. That impractically wastes computer hardware resources of, and memory resources in particular. In addition, when "print" is selected from the application program, a great number of printers are enumerated as available devices, undermining convenience of a user.

Limiting devices to be enumerated by using the technique described in Patent Document 3 also causes problems. For example, it is assumed that a handheld computer or the like is connected to an environment where a great number of printers are connected on a network in a large office or the like and a driver corresponding to three devices are installed as mentioned above. In such a case, user restriction information on the necessary three devices must be set as "available" and user restriction information on each of the remaining devices needs be set as "unavailable". That may lower the working efficiency.

SUMMARY OF THE INVENTION

The present invention is adapted to solve the abovementioned problems, and intends to improve user's convenience by limiting the number of device drivers to be installed due to a simple change in configuration at the client side. It also intends to further improve user's convenience by limiting the number of device drivers according to the priority specified by a user.

In order to achieve the abovementioned objects, the present invention has the configuration below.

Alternatively, an information processing apparatus which has a recognition function for recognizing connected peripheral devices and can make the connected peripheral devices available; comprising:

a holding unit adapted to hold the limit quantity of device drivers to be installed; and an install controlling unit adapted to install device drivers by the limit quantity held by the holding unit when device drivers corresponding to peripheral devices recognized by the recognition function are installed.

Alternatively, an information processing apparatus which can communicate with peripheral devices, store device drivers by the limit quantity according to priority set based on a predetermined condition and make the peripheral devices available; comprising:

a first receiving unit adapted to receive a first signal issued from the peripheral device;

a second receiving unit adapted to receive information on the peripheral device which is an issuer of the first signal received by the first receiving unit;

a determining unit adapted to determine whether the information on the peripheral device received by the second receiving unit and the priority of the peripheral device set based on the condition fulfills the limit quantity or not; and an install controlling unit adapted to install a device driver corresponding to the peripheral device when the determining unit determines that the priority of the peripheral device fulfills the limit quantity.

Alternatively, a control method of an information processing apparatus which has a recognition function for recognizing connected peripheral devices and can make the connected peripheral devices available; comprising:

a holding step of holding the limit quantity of device drivers to be installed; and an install controlling step of installing device drivers by the limit quantity held by the holding step when device drivers corresponding to peripheral devices recognized by the recognition function are installed.

Alternatively, a control method of an information processing apparatus which can communicate with peripheral devices, store device drivers by the limit quantity according to priority set based on a predetermined condition and make the peripheral devices available; comprising:

a first receiving step of receiving a first signal issued from the peripheral device;

a second receiving step of receiving information on the peripheral device which is an issuer of the first signal received by the first receiving step;

a determining step of determining whether the information on the peripheral device received by the second receiving step and the priority of the peripheral device set based on the condition fulfill the limit quantity or not; and an install controlling step of installing a device driver corresponding to the peripheral device when the determining step determines that the priority of the peripheral device fulfils the limit quantity.

Alternatively, a program recorded on a computer readable recording medium for causing a computer with a recognition function for recognizing connected peripheral devices to make the peripheral devices available; comprising:

codes of a holding step of holding the limit quantity of device drivers to be installed; and codes of an install controlling step of installing device drivers by the limit quantity held by the holding step when device drivers corresponding to peripheral devices recognized by the recognition function are installed.

Alternatively, a program recorded on a computer readable recording medium for causing a computer which can communicate with peripheral devices, store device drivers by the limit quantity according to priority set based on a predetermined condition and make the peripheral devices available; comprising:

codes of a first receiving step of receiving a first signal issued from the peripheral device;

codes of a second receiving step of receiving information on the peripheral device which is an issuer of the first signal received by the first receiving step;

codes of a determining step of determining whether the information on the peripheral device received by the second receiving step and the priority of the peripheral device set based on the condition fulfills the limit quantity or not; and codes of an install controlling step of installing a device driver corresponding to the peripheral device when the determining step determines that the priority of the peripheral device fulfils the limit quantity.

According to the present invention, the number of device drivers to be installed can be limited by a simple configuration at the client device side. In addition, it can further improve user's convenience by limiting the number of device drivers according to priority specified by a user.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table showing respective items and their options for specifying priority in FIG. 5;

FIG. 15 is a UI for displaying a list of printers;

FIG. 16A is a diagram showing an example before the detected printers are sorted according to priority;

FIG. 16B is a diagram showing an example after the detected printers are sorted according to priority;

FIG. 17 is a diagram showing an example of condition information;

FIG. 18 is a diagram showing an example of a printer list;

DESCRIPTION OF THE EMBODIMENTS

First Embodiment

An embodiment of the present invention will be described in detail below with reference to the drawings. Protocols or numeric values described in the embodiment are merely examples and are not intended to limit the scope of the invention to them.

<Hardware Configuration of a Printing System>

Figure 1:
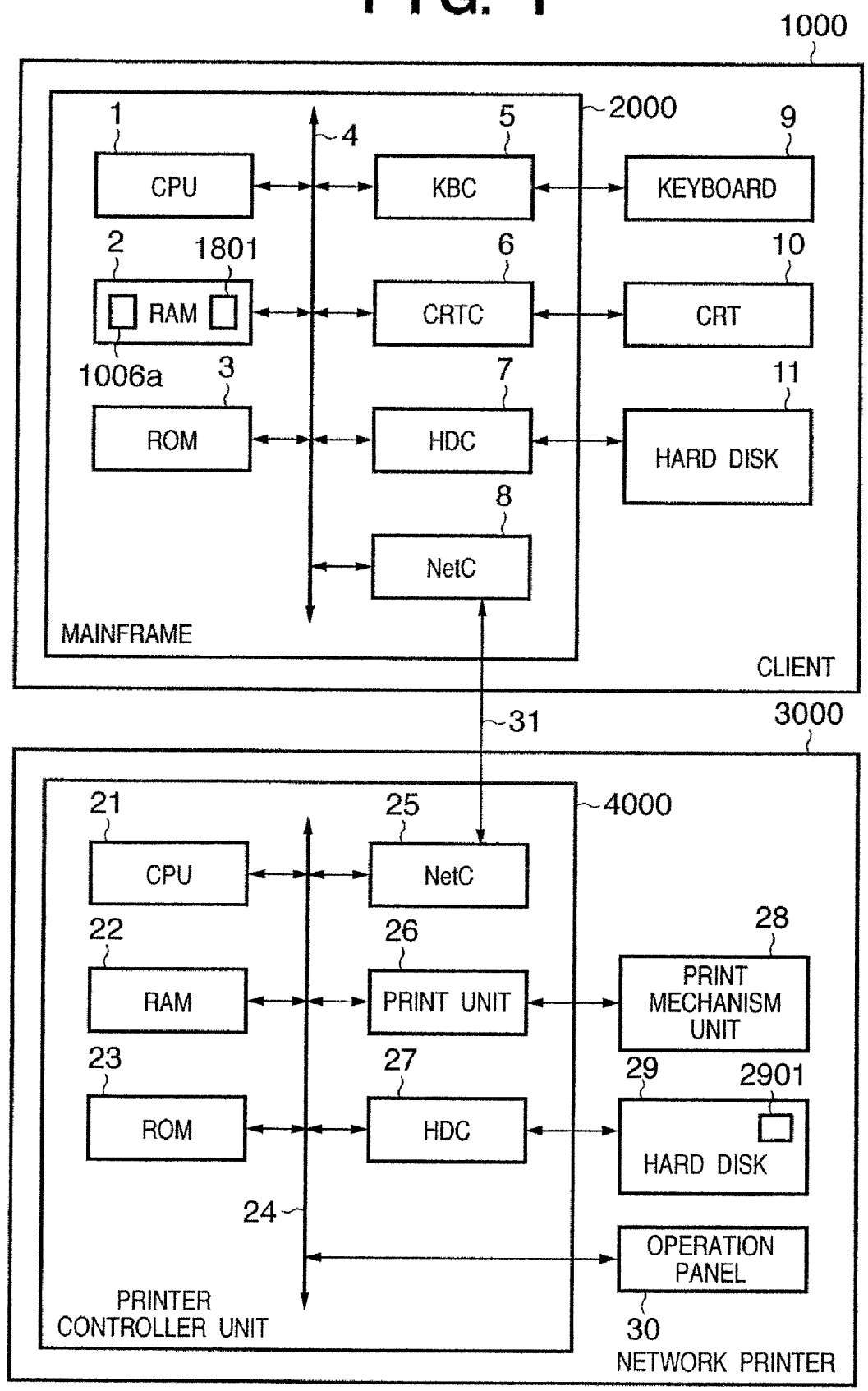
FIG. 1 is a hardware block diagram showing a connection between a client and a network printer in an embodiment of the present invention.

FIG. 1 is a block diagram showing a hardware configuration focusing on a single client and a single network printer which are connected to a network printing system which is an embodiment of the present invention. In FIG. 1, a client 1000 and a network printer 3000, which is a printing device, have a configuration of being connected via a network 31. In the client 1000, external devices such as a keyboard 9, a CRT 10, a hard disk 11 and the like are connected to a main body 2000. The main body 2000 has a CPU 1, which can load control programs or application programs stored in ROM 3 or the hard disk 11 onto RAM 2 and perform computations. A keyboard controller (KBC) 5 controls an input from the keyboard 9, which is an external device. A CRT controller (CRTC) 6 controls display of the CRT 10. A hard disk controller (HDC) 7 controls an input/output to/from the hard disk 11. A network controller (NetC) 8 is connected to the printer 3000 via a network 31 and controls communication with a printer controller unit 4000.

The CPU 1, RAM 2, ROM 3, KBC 5, CRTC 6, HDC 7, and NetC 8 are connected to one another by a system bus 4, with the CPU 1 controlling over the respective devices. The RAM 2 stores condition information 1006a which is a basis for determining a device ranking shown in FIG. 17. The RAM 2 stores a printer list 1801 in which network devices, particularly in the embodiment, network printers are ranked. If scope of the present invention is expanded to include a device other than a printer, the printer list is called a device list. The printer list 1801 includes names (identifiers) of devices recognized by a UPnP function provided by an operating system installed on the computer 1000. The condition information 1006a and the printer list 1801 are saved in the hard disk 11, and loaded to the RAM 2 when it is accessed by a CPU 3.

In the embodiment, a personal computer (PC) is assumed as a client. The client is not limited to a PC, however, and may be a hand-held terminal such as a PDA or a cellular phone, a digital home appliance and the like, if only it can implement the present invention. Any of the devices has the same configuration as that of the computer 1000 in FIG. 1 except for an I/O device for a specific purpose.

In the network printer 3000, a printer CPU 21 executes a control program stored in a program region of ROM 23. As it is executed, the CPU controls over accessing various devices connected to the bus 24 and image signals as print data is outputted to a print mechanism unit 28 (printer engine) connected thereto via a print unit 26.

The CPU 21 can communicate with the client 1000 via a network controller (NetC) 25. It is adapted to be able to communicate information inside the network printer 3000 to the client 1000 by communication. The RAM 22 functions as a main memory, a work area or the like of the CPU 21. The RAM 22 can also be used as an image rendering memory, video information storage, or others for storing print data or image bit map data received from the client 1000. Hard disk 29 controlled by the hard disk controller 27 is used for BOX saving of print job data. An operation panel 30 is a user interface for a user to operate the network printer 3000. The operation panel 30 consists of various switches, a LED display appliance, as well as a touch-panel type liquid crystal panel and the like.

The hard disk 29 saves configuration information database 2901 indicating a configuration of the printer 3000. The configuration information database is a database including various types of data. A configuration information database 2901 includes device type information, service information, frequency information of device usage, print speed information, color function information indicating the presence of a color print function, the highest resolution information, double-sided function information indicating the presence of a double-sided print function, manufacturer information and the like. Among the items, the frequency information of device usage is updated by the printer CPU 21 each time the printer is used. Whether a device driver was installed or not and the date and time of the install and the like are managed in the client 1000. For the other items, values according to the models of the printers are registered when it is manufactured. Device type information indicates a type of a device such as a single function printer, a copying machine or the like. The service information indicates a service provided by the device of the type. For example, for a printer, information indicating a type of a corresponding PDL such as the postscript (registered trademark) is registered as service information.

The network printer 3000 may be a single function printer, or a multifunction printer provided with functions of a scanner, a copying machine, a facsimile or the like, if only it is the device which can implement functions of the present invention. Any printing system such as a laser beam printer, a printer using an ink jet print function, a thermal printer or the like can be used as the print mechanism unit 28 without limiting on the functions of the present invention.

<Functional Block of Printing System>

Figure 2:
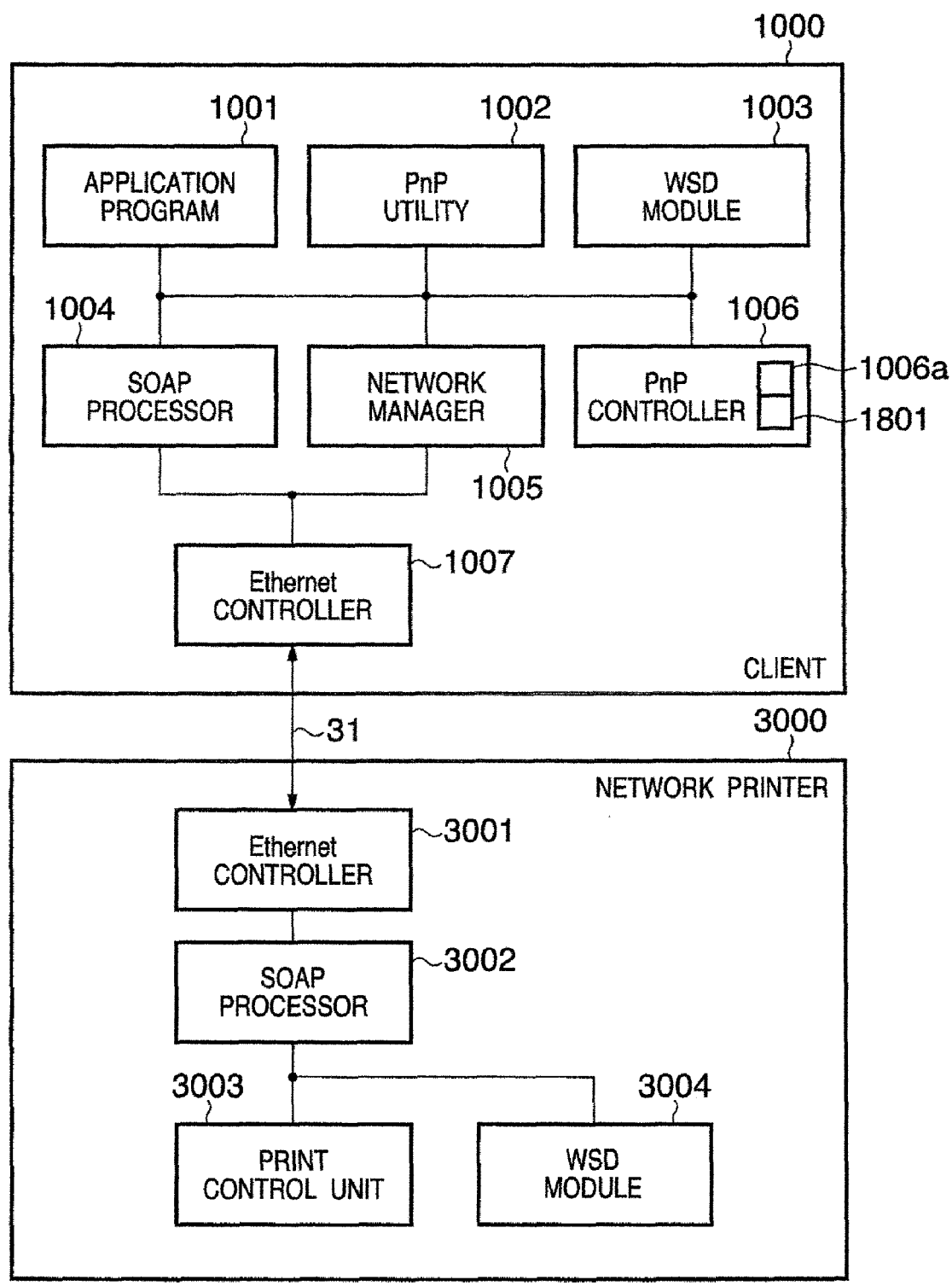
FIG. 2 is a block diagram for illustrating a module regarding a network connection between a client and a network printer.

FIG. 2 is a functional block diagram for illustrating a module regarding a network connection in the mainframe 2000 of the client 1000 and in the printer controller 4000 in the network printer 3000 shown in FIG. 1.

The client 1000 is compatible with the Ethernet (registered trademark) as a communication function and controlled by the Ethernet (registered trademark) controller 1007. Although the communication function is assumed to be the Ethernet (registered trademark) here, functions such as the WiFi (registered trademark: IEEE80.11a/b/g) or BlueTooth (registered trademark) can be considered. On the layer higher than an Ethernet (registered trademark) controller, Simple Object Access Protocol (SOAP) processor 1004 is provided. A plug and play (PnP) utility 1002, a WSD module 1003, and an application program 1001 and the like realizes two-way communication of data described in the eXtensible Markup Language (XML) via the processing unit.

A network manager 1005 manages the Ethernet (registered trademark) controller 1007 and has a function of obtaining setting information, information on a communication state. The plug and play (PnP) utility 1002 controls the network manager 1005 and has functions of obtaining information on the currently running Ethernet (registered trademark) controller, and the setting information, and recording it on the memory 2. The PnP utility 1002 controls a plug and play setting UI and records the setting contents on the memory 2. The setting information is converted into the XML (extensible Markup Language) by the PnP utility 1002 and recorded on the memory 2 in the form of the XML.

The WSD module 1003 executes respond processing to a Hello message informed from the network device based on the WS-Discovery specification via the SOAP processor 1004. The WSD module 1003 executes issue processing of a Probe message for searching a network device. The WS-Discovery specification is a standard which the Microsoft Corporation and the like are promoting the development. The WSD module 1003 issues a GetMetadata message based on the WS-MetadataExchange specification. The WSD module 1003 obtains configuration information of a network device by receiving a responding message (Metadata for Device) sent by the device in response to the GetMetadata message. The GetMetadata message includes configuration information of the device.

When a network device is found by the message processing, the WSD module 1003 informs the PnP controller 1006 of the found configuration information of the network device. The PnP controller 1006 has a function of reading an applicable driver or applicable utility software from the hard disk 11 or the memory 2 based on the informed configuration information, and installing it on the client 1000. Alternatively, if a software managing server for managing a software program such as a driver or the like is connected to a network, the program such as the driver may be read from the software managing server.

The application program 1001 is, for example, a word processing application program or the like. The application program 1001 can print edited document data by a printer which is a network device. At that moment, the application program 1001 sends print job data to the network printer 3000 via the driver or utility installed by the PnP controller 1006. As such, as the client 1000 has the abovementioned configuration, it can recognize a connected peripheral appliance.

On the other hand, the network printer 3000 also has a communication function compatible with the Ethernet (registered trademark). The communication function is controlled by the Ethernet (registered trademark) controller

3001. On the layer higher than the Ethernet (registered trademark) controller 3001, Simple Object Access Protocol (SOAP) processor 3002 is provided. A WSD module 3004 and a print control unit 3003 realize two-way communication of data described in the extensible Markup Language (XML) via the SOAP processor 3002, respectively.

Here, the WSD module 3004 executes send processing of a Hello message when the network printer 3000 is connected to the network via the SOAP processor 3002. The WSD module 3004 executes respond processing to a Probe message issued from the client 1000. The Hello message and the Probe message are messages based on the WS-Discovery specification, which the Microsoft Corporation and the like are promoting the development.

The WSD module 3004 returns configuration information (Metadata for Device message) owned by the network printer 3000 in response to the GetMetadata message issued from the client 1000. Exchanging of the messages is based on the WS-MetadataExchange specification, which the Microsoft Corporation and the like are also promoting the development.

<Outline of WSD Operation>

Figure 3:
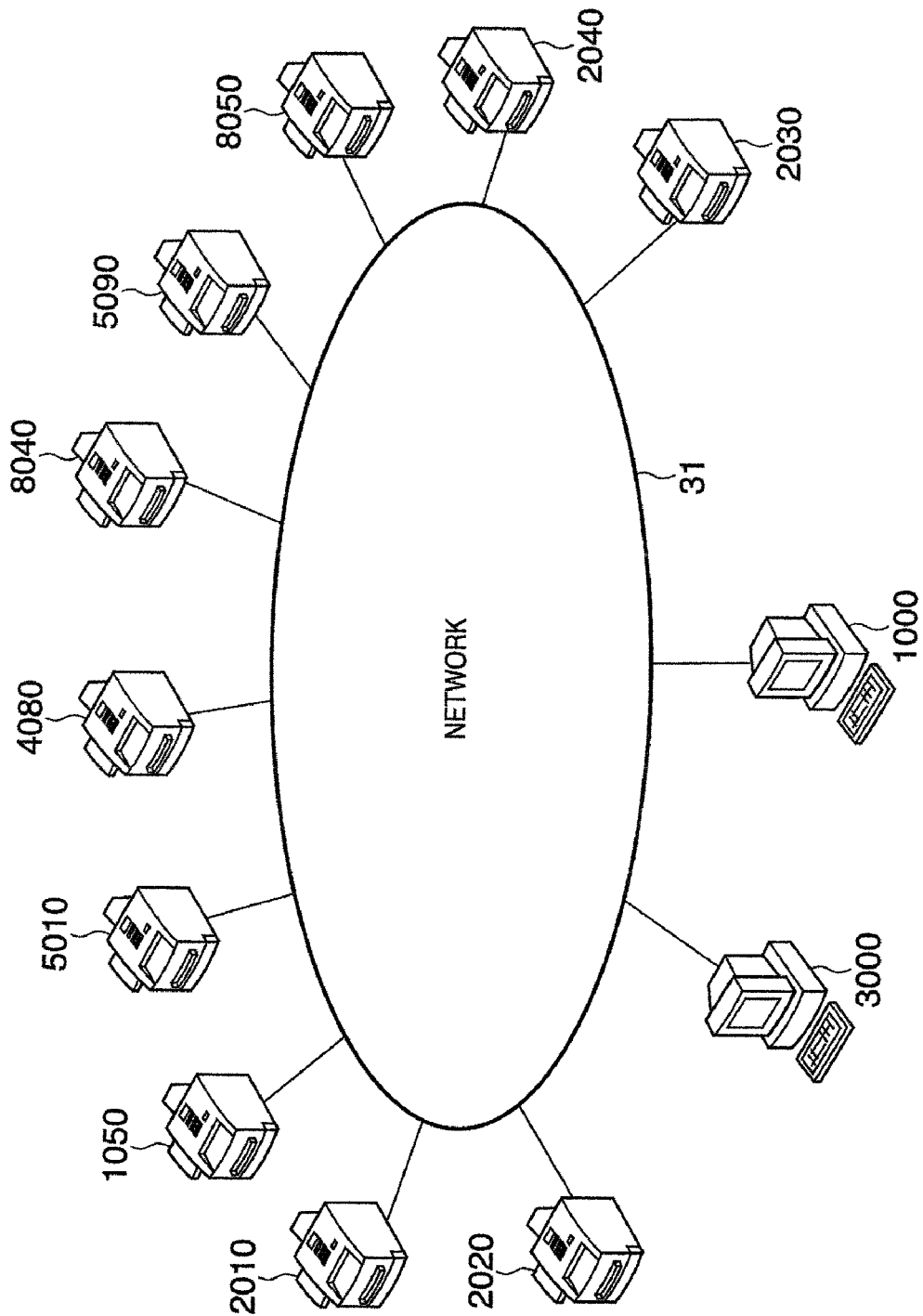
FIG. 3 is a conceptual diagram of a network environment in the embodiment.

FIG. 3 shows a conceptual diagram of a network environment in the embodiment. Ten network printers of a plurality of types are connected to a single network 31, with the client 1000 being connected to the same network 31. Each of the network printers connected to the network 31 has the same configuration as that of the printer 3000 of FIG. 2, having a function of the WSD. It is needless to say that the client 1000 has a configuration of the computer 1000 of FIG. 2.

Figure 19A:
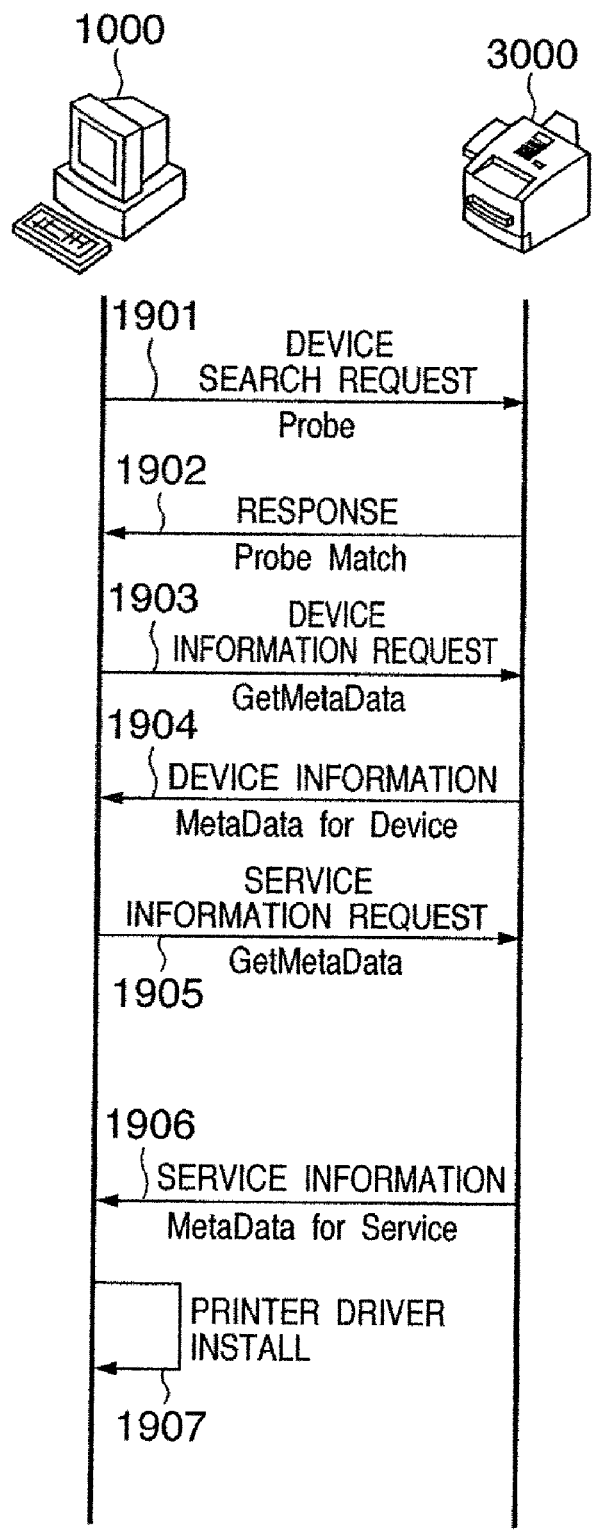
FIG. 19A is a sequence diagram of the WS-Discovery (the case where a computer takes the initiative)
Figure 19B:
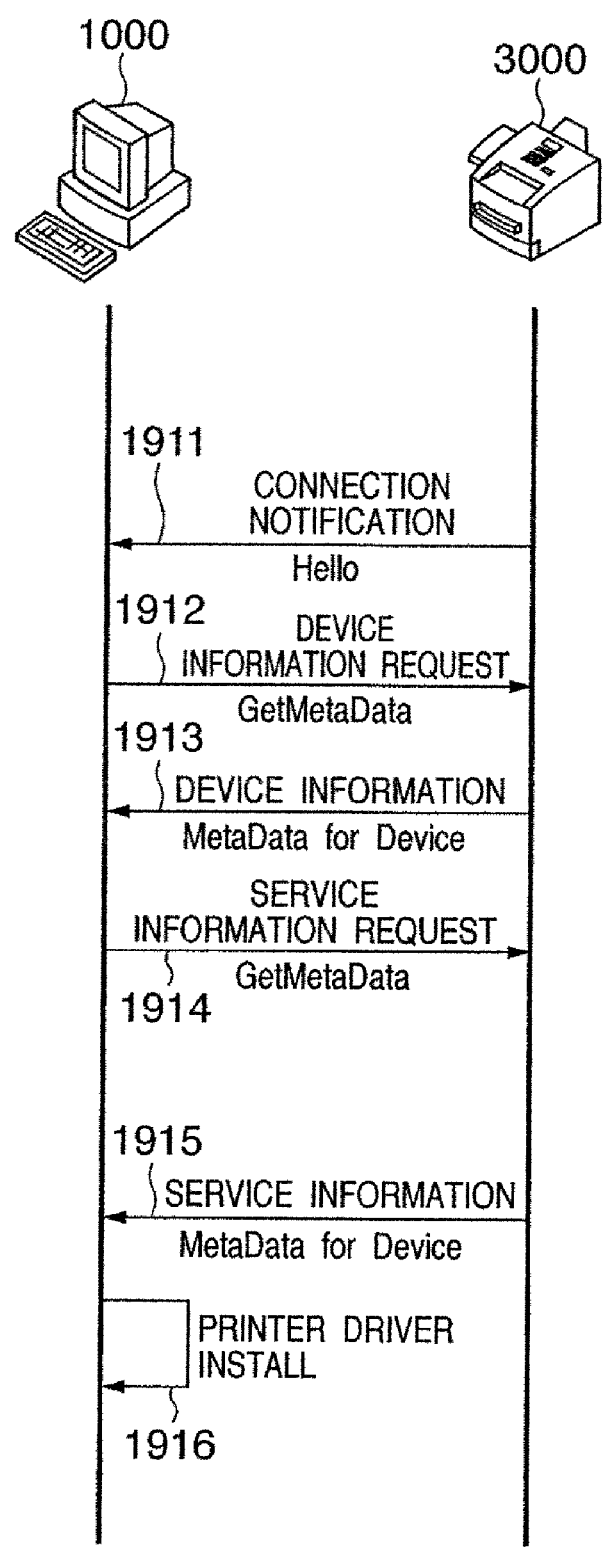
FIG. 19B is a sequence diagram of the WS-Discovery (the case where a peripheral device takes the initiative)

FIG. 19A, FIG, 19B are installing procedure charts of a device driver according to the WS-Discovery protocol and the WS-Metadata protocol by the client computer 1000 and the network printer 3000 connected to the network 31. FIG. 19A, FIG. 19B show outlines of them. Although they also have conditional processing according to the settings shown in FIG. 4, it is omitted in FIG. 19A, FIG. 19B. The condition will be described along with flows of FIG. 4 and after and FIG. 7 and after.

FIG. 19A is an example of a searching procedure which makes operation in a client computer as a trigger, for example. For example, in the Windows (registered trademark), a function of "add a printer" is provided for a user. When a user executes the function, a procedure of FIG. 19A is executed. First, a device search request (Probe) message 1901 is sent from the client computer 1000 to the printer 3000. The device search request message 1901 is broadcasted to the entire network 31. The device search request message 1901 is written in the XML, and includes information indicating that the message is a device search request message or the type of a searched device as well as definitions of name spaces for the WS-Discovery. In the embodiment, as the type of the searched device is a printer, on the type tag defined by the WS-Discovery, "PrintBasic" is described. Information indicating the kind (type) of a message is similarly included in each message to be described below.

The device which received the device search request message 1901 determines the kind of the message. If it is the device search request message 1901, the device reads the type of the searched device from the message, and determines whether the type matches the type of the device or not. The determination is performed as device type information saved in the configuration information database 2901 of the device and the type of the searched device included in the device search request message are matched. If they match, the device is the searched device. Accordingly, device type information saved in the configuration information of devices is desirably saved in the same form as the type of the device search request message.

When the device determines that the searched device is itself by the device search request message, it sends a response (Probe Match) message 1902 to the client 1000. The response message 1902 includes an address of the responded device (for example, an IP address).

The client 1000 sends a device information request (GetMetaData) message 1903 to the device which sent the response message 1902. The device information request message 1903 is a message for obtaining information which configuration information database 2901 of the device is accessed and specified. In the embodiment, the client requests data of items indicating configuration information of the device such as a frequency of device use, a print speed, the presence of a color print function, the highest resolution, the presence of a double-sided print function, a manufacturer and the like.

The printer 3000 that received the device information request message 1903 reads the contents of the requested items from the configuration information database 2901. Next, it contains information on the contents of each of the read items in a device information (MetaDataforDevice) message 1904 and sends it to the client 1000.

The client 1000 that received the device information 1904 then sends a service information request (GetMetaData) message 1905 to the device. The service information request (GetMetaData) message 1905 is a message for obtaining service information indicating a service which the destination device can provide from the configuration information database.

The device received the service information request message 1905 reads service information from the configuration information database 2901 and writes it into service information (MetaDataforService) message 1906 and sends it to the client 1000.

The client that received the service information message 1906 installs a device driver corresponding to the service information based on the service information included in the message on the client 1000 (1907). With the processing, information on the connected peripheral device can be acquired (collected). If the device driver corresponding to the service information is included in the database of a driver file of the client 1000, it is read from the database and installed. If it is not included in the database of the driver file of the client 1000, the driver file is downloaded from the software managing server connected to the network, for example, and installed. The device driver corresponding to the service information can be identified based on directory information in which a service information is associated with a device driver file name (including information indicating the location of the file), for example. The client references the directory information and acquires the device driver file name corresponding to the received service information. It reads the device driver file indicated by the acquired file name and installs it. The directory information is held and managed by the client 1000 or the software managing server.

On the other hand, FIG. 19B is an example of a searching procedure which makes adding operation of a network device, such as connecting a network device such as a printer to a network and switching on, a trigger. When the device is connected to the network, the Ethernet (registered trademark) controller 3001 recognizes the connection to the network. That triggers the printer 3000 to send a notification of connecting to a network (Hello) message 1911 to the client computer 1000. The "notification of connecting to a network" is hereinafter referred to as a "connection notification". The device search request message 1901 is broadcasted to the entire network 31. The connection notification message 1911 includes at least address information indicating the location of the source printer 3000 of the connection notification message 1911.

The client 1000 that received the connection notification message 1911 sends a device information request (GetMetaData) message 1912 to the source device of the message 1911. The device information request message 1912 is a message with the same contents of the device information request message 1903.

The printer 3000 that received the device information request message 1912 reads the contents of the requested items from the configuration information database 2901. Next, it contains information on the contents of each of the read items in the device information (MetaDataforDevice) message 1913 and sends it to the client 1000.

The client 1000 that received the device information 1913 sends a service information request (GetMetaData) message 1914 to the printer 3000. The service information request (GetMetaData) message 1914 has the same contents as that of the service information request message 1905.

The printer 3000 that received the service information request message 1914 reads service information from the configuration information database 2901, writes it into a service information (MetaDataforService) message 1915 and sends it to the client 1000.

The client 1000 that received the service information message 1915 installs a device driver corresponding to the service information based on the service information included in the message on the client 1000 (1916). The procedure is executed in the same way as the installing in FIG. 19A.

An installing procedure of the device driver complying with the WS-Discovery has been described. In the procedure, a device driver of a device (printer) selected according to the condition information 1006a is installed during the install processing 1907 of FIG. 19A and the install processing 1916 of FIG. 19B, in the embodiment. Further, a device driver of the device (printer) which is not selected according to the condition information 1006a is uninstalled. It will be described in detail below.

<Setting User Interface of Condition Information>

Figure 4:
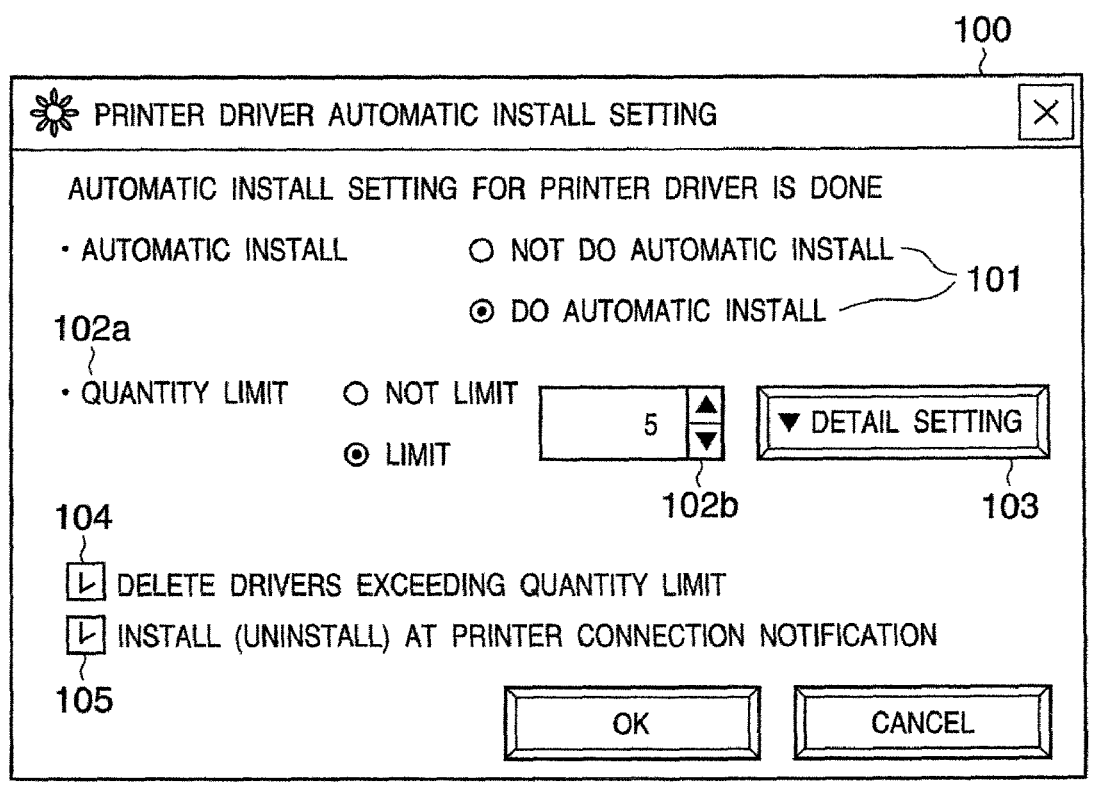
FIG. 4 is a diagram showing an example of a printer driver automatic install setting UI on a client.

FIG. 4 shows a printer driver automatic install setting UI displayed on the CRT 10 of the client. A user performs an automatic install setting of a printer driver by using the setting UI 100 when it connects the client 1000 to the network 31 in which a plurality of network printers are set up as shown in FIG. 3. The automatic install radio buttons 101 displayed at the top of the UI 100 are radio buttons for specifying whether the printer driver for the network printer is automatically installed by network plug and play or not. If the automatic install radio button 101 is set as "do", the client 1000 starts the procedure of FIG. 19A. The procedure of FIG. 19B is started by the device. Therefore, if the automatic install radio button 101 is set as "not do", the client 1000 does not respond to the connection notification message. The automated install of the network device (printer) by the WSD described in FIG. 19A, FIG. 19B is called as a network plug and play function.

The user who inputted "do" for the automatic install then specifies a limit value of the number of printer drivers to be automatically installed with a quantity limit radio button 102a and a spin box 102b. If "not limit" is specified to the quantity limit radio button 102a, the number of devises to install the printer drivers is not limited. On the other hand, if "limit" is specified, the user inputs the limit value by the spin box 102b. Next, the client 1000 holds the inputted value in the RAM 2 as the limit quantity of the device driver to be installed. The program installed in the client 1000 can store the inputted limit value in the RAM 2.

If the number of devices to install the drivers is to be limited, a user can specify an item of attribute information which is a key for deciding rankings (priority) of printers whose drivers are to be installed. A plurality of network printers found by plug and play are given priority based on the specified attribute information as a key and device drivers corresponding to printers at the ranking within the specified limit value are installed. The user presses a detail setting button 103 for specifying attribute information to be used as a key. The UI when the detail setting button 103 is pressed is shown in FIG. 5.

The user can specify to delete drivers exceeding the quantity limit by using a check box 104. The user also specify to automatically install (uninstall) at printer connection notification by using a check box 105. The procedure shown in FIG. 19B is executed as far as the check box 105 is checked. Details of the operation for checking each check box will be described below. Setting contents of each check box is saved in the RAM 2 as a quantity limit flag 1711, an automatic install flag 1712, a driver delete flag 1713 and a printer lead flag 1714, which are a part of the condition information 1006a shown in FIG. 17. The limit value is saved in the limit value field 1700. The limit value is also called a limit quantity. The PnP controller 1006 holding the condition information 1006a also functions as holding means.

Figure 5:
FIG. 5 is a diagram showing that a detail setting button in FIG. 4 is pressed.

FIG. 5 is a diagram showing a simplified UI to be displayed when the detail setting button 103 in FIG. 4 is pressed. A table 201 for specifying priority is additionally displayed to the UI of FIG. 4. In order to decide priority, the user sets attribute information (set value) which the user wants it to be automatically installed as a printer driver such as "ten times or more in a week" or "1200 dpi" or more in the predetermined items, such as a frequency of use or the highest resolution, respectively. The user inputs request levels in respective items and sorts the items in the descending order of importance among the items of the attribute information by using an UP button 202 or a DOWN button 203. Examples of respective items and a detailed example of items of a combo box for specifying a degree to each of the items are shown in FIG. 6.

FIG. 6 is a table showing respective items and respective options for specifying priority in FIG. 5. The top fields 301 to 309 indicate item names and the second fields and lower indicate options for each item. For example, two options of "installed" and "uninstalled" are present for an item of driver 301. A user can specify either of the options in a specifying field 201a in the table 201 of FIG. 5. For example, if "installed" is selected as attribute information, the client 1000 gives higher priority to a peripheral device corresponding to an installed device driver than priority of a peripheral device corresponding to a not-installed device driver. The specified value is saved in the condition information 1006a of FIG. 17. Priority (key ranking) 1701 and a key identifier 1702, corresponding set value 1703 are saved for each item in the table. As the priority 1701 can be shown in the arranged order of items, it is not necessary. In the embodiment, the found printers are classified into two categories one of which includes printers match with a set value specified in the table 201 of FIG. 5 and the other of which includes printers do not match with the set value based on the set value as a classification condition from the item of top priority. Devices belonging to each category are further classified into two categories in the similar manner for the item of the next priority. The classification is repeated for each item according to the priority. Then the printer "applicable" with a classification condition for an item of higher priority is evaluated as a printer of higher priority. One of the conditions for setting priority is a function of each peripheral device. The client 1000 can give higher priority to a peripheral device having a specified function than priority of the peripheral devices having no specified function. For example, in the example of FIG. 5, "color print", "highest resolution", "double-sided printing" and the like correspond to functions of a peripheral device.

Next, a specific example of setting priority will be shown below. For example, priority can evaluate rankings of printers by expressions below. Here, priority of each item is "p", and the number of items is "n". The function "s" is defined as s(p)=1, if the focused printer matches with a condition indicated by a set value of an item of priority "p", and defined as s(p)=0, if the focused printer does not match with the condition. Evaluation of the function "s(p)" is performed based on configuration information corresponding to the focused printer and the set value 1703 which are registered in the printer list. Then, a value of a printer ranking $Pi=\Sigma(s(p)*2^{n-p})$, p=1 . . . n is calculated for a focused printer "i" among the printers searched on the network. "$\Sigma X(p)$, p=1 . . . n" indicates a computation for obtaining the total of X(p) by incrementing a value of "p" from p=1 to p=n one by one. The value "Pi" obtained for all the printers indicates the ranking of the printer "i". The bigger the value "p" becomes, the higher the ranking of priority indicated by the "p" becomes. The higher the value "Pi" becomes, the higher priority of the printer becomes. When a set of the key ranking 1701, the key 1702 and a set value 1703 of the condition information 1006a of FIG. 17 are sorted in the order of the value "Pi", priority can be set to connected peripheral devices based on information set in FIG. 5 as predetermined attribute information. As it is enough that rankings are to be shown, it is a matter of course that the value "Pi" can be attached to condition information 1006a instead of a key ranking. Even if a plurality of printers have the same value Pi, drivers should be installed to the number of printers within the upper limit. The above setting processing of priority can be summed up as setting attribute information for deciding a device driver to be installed by using the UI of FIG. 5. Based on the set attribute information, priority of the device driver (printer ranking) is set or calculated. The printer ranking becomes higher if the priorities of the items included in the attribute information of the printer become higher. The printer ranking may be called as "priority". If printers are expanded to general peripheral devices, a ranking of the peripheral devices is called a device ranking.

Although an example where options for each item are prepared is shown in the embodiment, even a case where a user can manually set the values does not depart from the spirit of the present invention. If the settings are held in an external file, a ranking corresponding to a new printer function or a spec can be set.

<Driver Install Processing>

By using FIG. 7 to FIG. 12, flows in the embodiment of the present invention will be shown. The flows show a procedure shown in FIGS. 19A and 19B by a processing procedure of a client.

Figure 7:
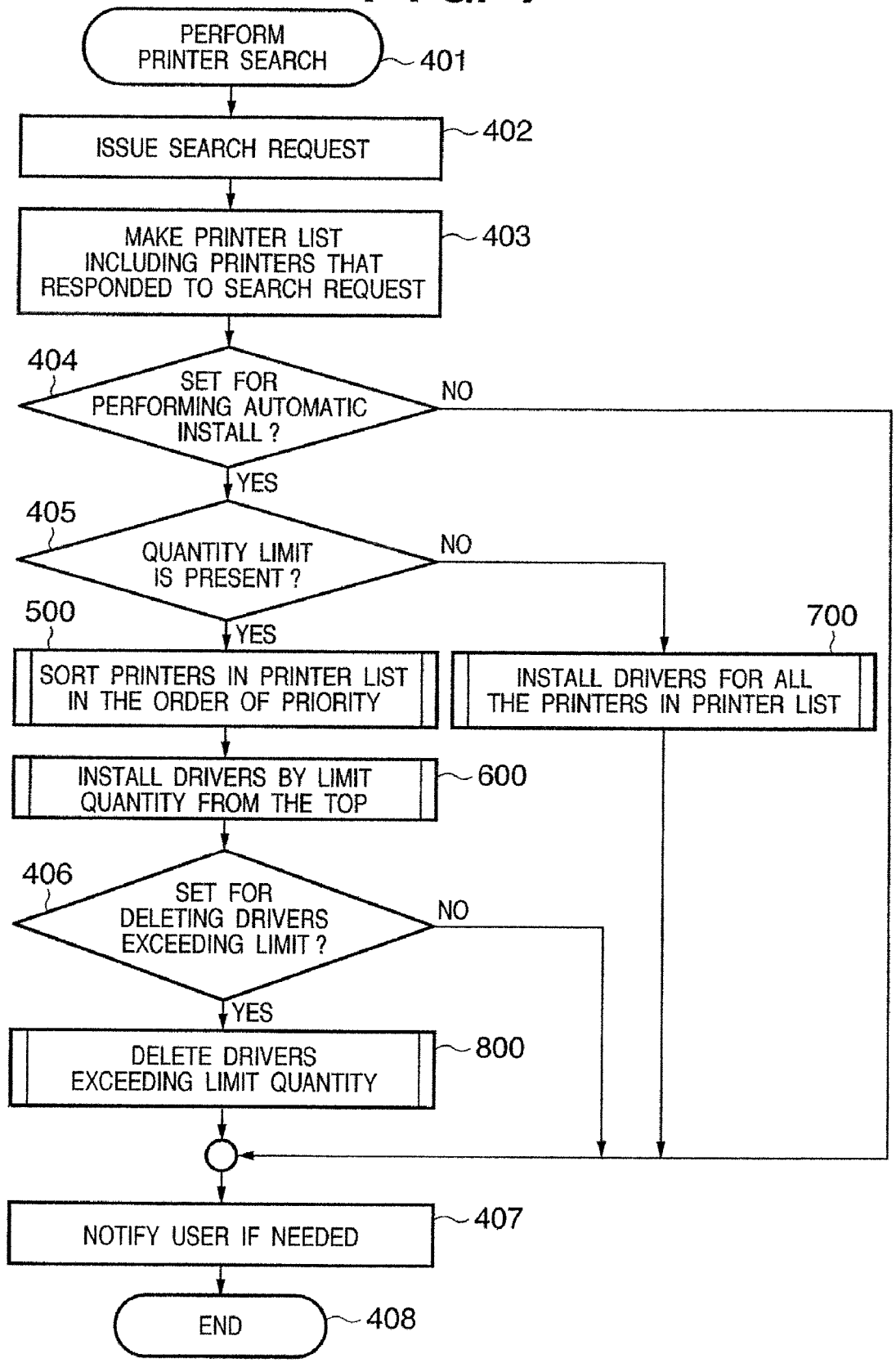
FIG. 7 is a flowchart when a client performs a printer search request (Probe)

FIG. 7 shows a flow where a client performs a printer search request (Probe request) to a network. The timing for a client performs the printer search request may be when a PC connected to a network starts, or when a list of connected printers are updated on a PnP utility. Processing of each step in the flowcharts from FIG. 7 to FIG. 12 is executed by the CPU 1 of the client 1000.

First, the WSD module 1003 issues a request for searching (Probe request) from a client to a network (402). In response to that, each of printers connected to the network returns a response (ProbeMatch) indicating that it is connecting. The client stores all the printers that responded to the request for searching in the RAM 12 as a printer list (403). Here, information for installing a driver such as device information (printer name) or configuration information is necessary to the printer list. As shown in FIG. 19A, the WSD module 1003 sends the device information request message 1903 and the service information request message 1905 to the devices responded. Hereby the client acquires device information and service information. The printer list is created based on the responded device information and the service information.

FIG. 18 shows an example of a printer list. The printer list 1801 includes fields such as a device ID 1811, a printer name 1812, configuration information 1813, a driver status 1814, an evaluated point 1815, and a high-ranking printer flag 1816. The device ID 1811 is an identifier unique to a device in a network.

The configuration information 1813 shows such as whether a function or a driver is needed or not. The configuration information 1813 includes information for enabling to determine whether each item for which priority is specified in FIG. 5 is applicable to the condition or not. The date and time the device is detected for the first time is registered in the printer list for determination of information which cannot be obtained from the device (for example, year and date and time of install). As the frequency of use is desirably a total value of clients, if the printer driver has a statistic function, the frequency of use totaled by the statistic function is registered in the printer list. An item on whether a driver is installed or not can be also selected for ordering the printers at installing drivers. The item cannot manage a printer device. In the embodiment, whether a driver is installed or not is indicated by a driver status.

The driver status 1814 indicates whether the driver is installed or not. The driver status is "Installed" if the driver is installed, and "Discovered" if not installed. Therefore, the status of the device which first responds to the search request and on which a driver is not installed is a status of "Discovered". The point is a value evaluated at the step S503. The high-ranking printer flag indicates a printer whose driver is to be installed, if a quantity limit for a driver is set.

If it is determined that "do automatic install" 101 is specified in the UI 100 of FIG. 4 (404—Yes), the client proceeds to the next step. If not, the client notifies the user if needed (407) and ends the processing (408). Specifying of automatic install is determined as the automatic install flag 1712 is referenced. If automatic install is specified, the client determines whether the quantity limit is specified in the UI of FIG. 5 or not by referencing the quantity limit flag 1711 (405). If the quantity limit is specified, the client proceeds to the next step. If the client determines that the quantity limit is not specified, it automatically installs all the drivers corresponding to respective printers of the found printer list (printer list 1801 of FIG. 1 and FIG. 18) (700). The found printer list is a list of printers which returned a respond message to a search request. The printer list includes names, addresses, statuses of the printers, for example. The procedure for installing drivers applicable to all the printers is described in FIG. 10.

On the other hand, if the quantity limit is previously specified, the client 1000 next sorts printers on the printer list in the order of the priority specified by the user (500). Details of sorting will be described in FIG. 8. When the sorting ends, the client installs drivers corresponding to the limit quantity of the printers from the top (600). That is to say, if a device driver corresponding to a peripheral device recognized by a recognition function of the WSD is to be installed, the processing of the step 600 corresponds to processing of installing the limit quantity of device drivers held in the RAM 2. The limit quantity is saved in the RAM 2. The flow is shown in FIG. 9. After drivers corresponding to the limit quantity of printers from the top of the printer list have been installed, the client 1000 finally checks whether or not it is set to delete (to uninstall) the drivers exceeding the limit quantity (406). That indicates whether or not the check box 104 for deleting drivers exceeding the quantity limit in FIG. 4 is checked by the user. If it is checked, the client 1000 deletes drivers exceeding the limit quantity (800). At the step 406, whether or not the check box 104 is checked can be determined if only the driver delete flag 1713 is tested. The detail of that will be described in FIG. 11. Ultimately, the client 1000 performs user notification for describing operation performed in response to a search request (407) and ends (408). The notification is performed by display, for example. The displayed contents include a list of devices (or services) for which drivers are newly installed and drivers uninstalled, and the like.

By executing the processing of FIG. 7, the client 1000 can install the limit quantity of printer drivers from the top of the printer list based on the set limit quantity and the priority set by a user. If a driver corresponding to a device for which specified priority is outside the limit quantity is installed, the driver is uninstalled. That can prevent a memory from being wasted due to install of an unnecessary driver.

<Sorting of a Printer List>

Figure 8:
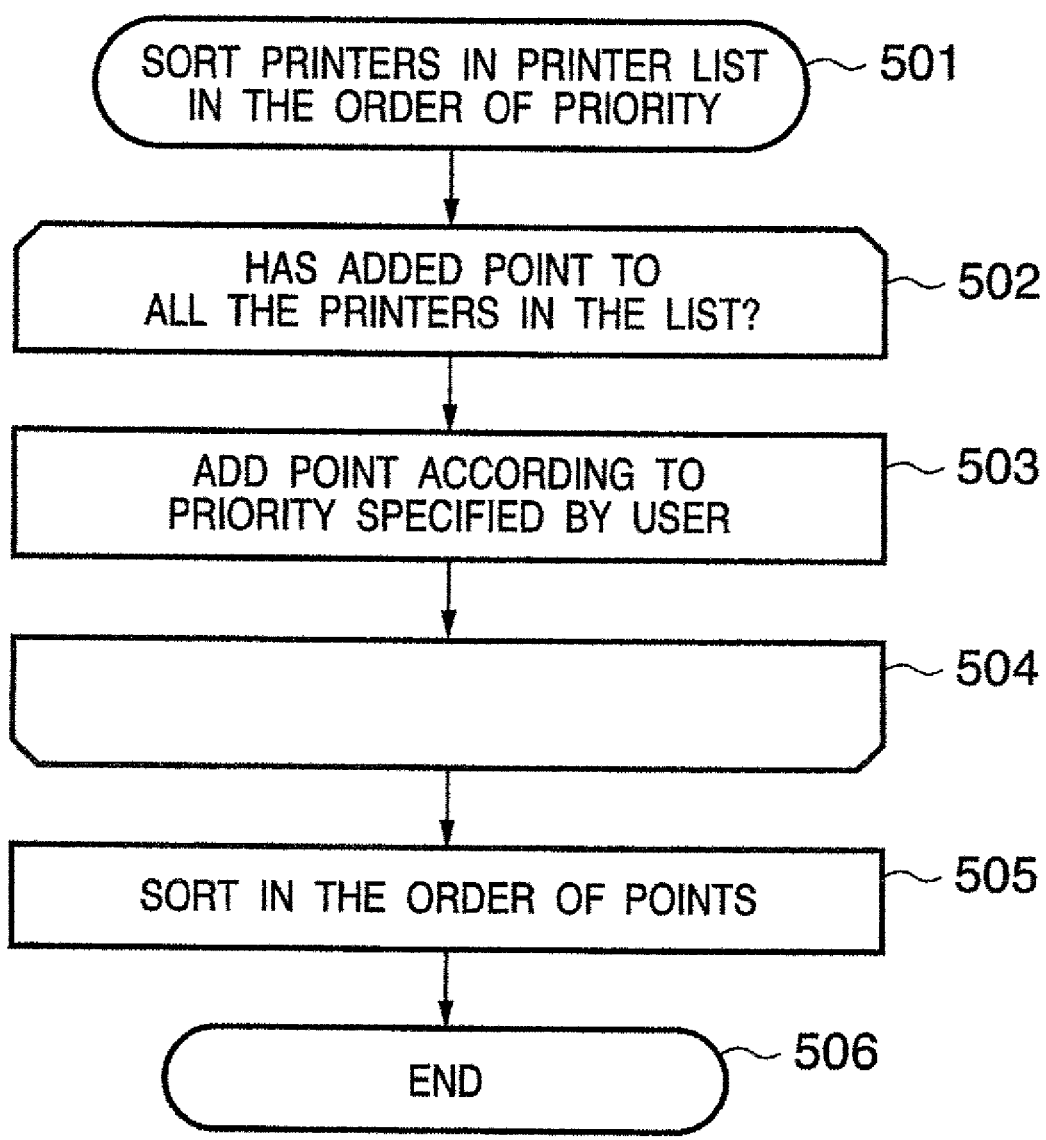
FIG. 8 is a flowchart when printers are sorted according to priority.
Figure 9:
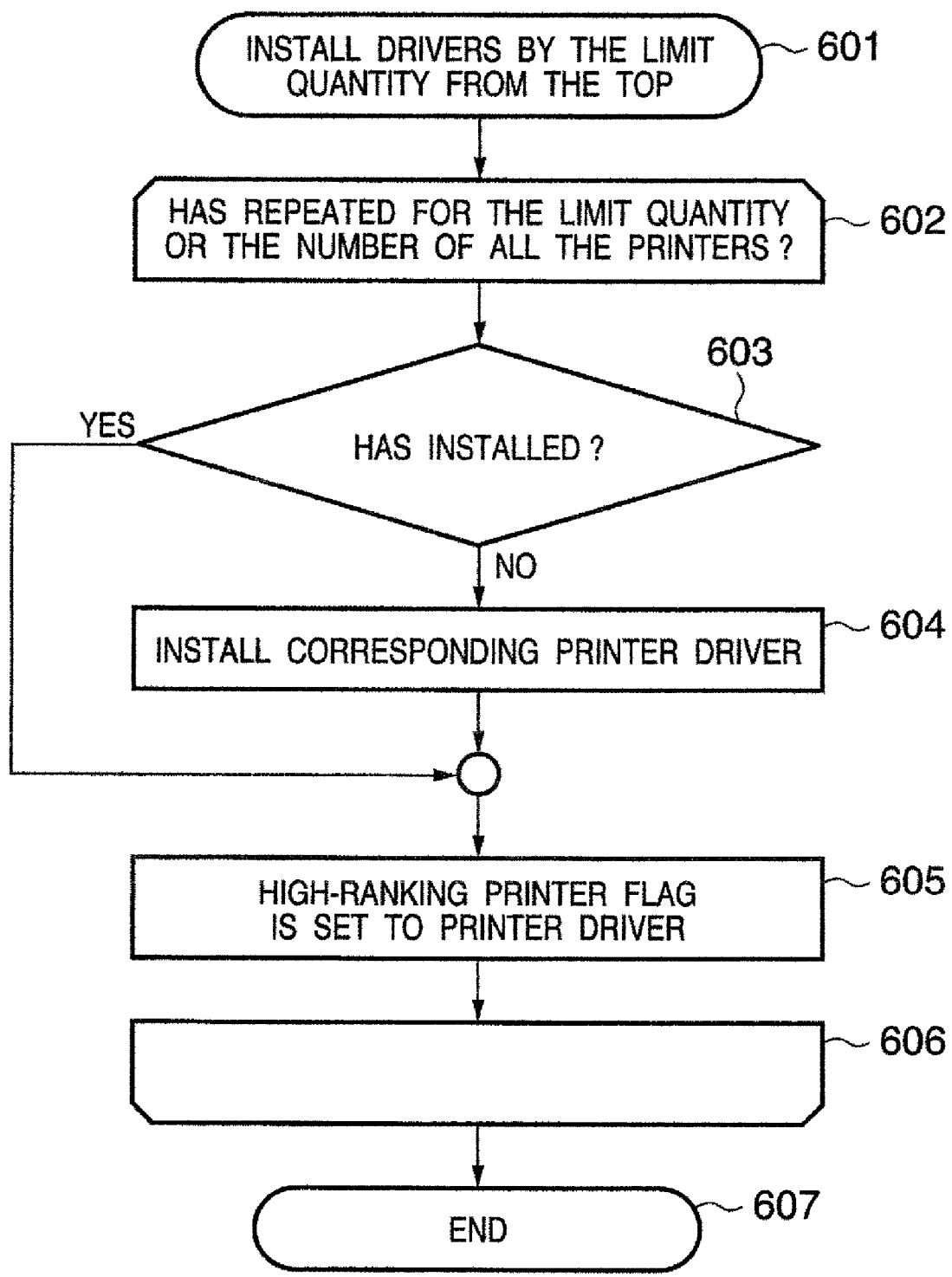
FIG. 9 is a flowchart when drivers by the limit quantity from the top are installed.

FIG. 8 shows details of the step 500 of sorting printers in the printer list in the order of printer rankings in FIG. 7. First, the client 1000 performs tasks of adding points according to the priority specified by the user on all the printers in the list (502-504). The points are calculated by using the abovementioned expressions "$Pi=\Sigma (s(p)*2^{n-p})$, p1 ... n". It is the matter of course that expressions are not limited to the expressions, if the points reflecting the priority can be calculated by the expression. As the point "Pi" for the device "i" can be evaluated by the expression, the recognized peripheral devices can be ranked based on predetermined attribute information. In the figure, a hexagonal box (referred to as a starting box) such as that of the step S502 indicates the starting of a loop, with the contents indicating an ending condition. A hexagonal box (referred to as an ending box) such as that of the step S504 indicates the ending of a loop. If the ending condition described in the starting box is satisfied, the loop processing finishes and the processing proceeds to the step immediately below the ending box. When points have been evaluated for all the devices included in the device list, the device list is sorted in the order of the points (505).

With the processing of FIG. 8, as the high priority is set to the device matching with the condition the user wants, the number of drivers to be installed can be limited and also the driver corresponding to the device which reflects the user's intention can be installed.

FIG. 18 shows an example of a sorted printer list. For example, the name of a printer whose device ID=xxxx is "Printer from company C 1050", with a driver status of "Installed". That is to say, the driver has been already installed. As the printer of device ID=xxxx satisfies conditions of nine items, full points, that is 511 points, is given to the printer. The point is evaluated based on configuration information shown in a table 1601 of FIG. 16. The driver status may not be included in the printer list 1801. For example, a list of installed printer drivers which is registered in a registry managed by an operating system may be requested of the operating system each time an installing status of the driver is referenced.

FIG. 16A, FIG. 16B show the cases of ten printers with various functions and various performances being sorted when they are connected to a single network. FIG. 16A shows the case before sorting, and FIG. 16B shows the case after sorting. The network environment is shown in FIG. 3. For FIGS. 16A and 16B, it is assumed that priority shown in FIG. 5 is specified by a user as an automatic installing setting. In the list before sorting 1601, printers are arranged in the order they are searched. In the list after sorting 1603, the higher ordering of priority requested by a user the printer matches with, the higher the printer is displayed on the list. The list 1603 shows the printer list 1801 in FIG. 18 in association with configuration information for each device instead of evaluation points of the devices. In FIGS. 16A and 16B, "o" indicates that the condition is satisfied. The ordering of priority of the items "p" lowers from the left side to the right side. Therefore, if the list is sorted by the evaluation points, it is sorted in the same ranking as that in the FIG. 16B. For example, the driver state is at the highest priority. As the items of configuration conditions are nine in FIG. 16A, the ordering of the priority of the driver state is nine. Thereafter, the priority lowers like eight, seven, ... , one in the order of the frequency of use, the date and year of insertion, ... , and the manufacturer. By using that, the printer ranking "Pi" is obtained by the abovementioned expressions, and sorted in the descending order, it is arranged as shown in FIG. 16B.

<Driver Install for the Specified Number of Printers>

FIG. 9 shows details of the step 600 for installing drivers by the limit quantity from the top in FIG. 7. First, the client 1000 once resets the high-ranking printer flag to zero. The client 1000 focuses the printer in order from the top of the printer list 1801, and determines whether a printer driver for the focused printer has been installed or not (603). If the client 1000 determines that the printer driver for the focused printer has not installed yet by the processing at the step 603 (603—NO), it installs the printer driver for the focused printer (604). The driver to be installed can be identified based on the name of the printer, for example. A name of a printer is assumed to be given so as to uniquely identify the driver of the printer. If a driver cannot be uniquely identified from the name of the printer, device information and service information are saved and the driver is decided based on the device information and the service information. The client 1000 repeats the processing for the printer to be installed. The number of times to be repeated is the limit quantity if the number of found printers exceeds the limit quantity; and the number of all the printers if the number of found printers is equal to or less than the limit quantity (602). Whether a driver is installed or not can be determined as the driver status (or a registry) is referenced.

The processing of FIG. 9 is for installing a device driver which is not installed among device drivers corresponding to peripheral devices whose set ranking is the limit quantity or under. With the configuration, candidates for device drivers to be installed are decided based on the acquired information on peripheral devices with the limit quantity held in the RAM 2 being the number of device drivers which can be installed. Next, device drivers which have not been installed among the candidates decided for the device drivers can be installed. Therefore, the processing for installing the already installed driver again can be eliminated.

At this moment, the high-ranking printer flag indicating that it is within the high-ranking limit quantity of the printer list is set to each printer whose printer driver is installed or has already been installed (605). For example, assume the upper limit of the quantity limit is five. Drivers corresponding to the high-ranking four printers have been installed in an example of FIG. 18. Therefore, the drivers corresponding to the four printers need not to be installed and only the high-ranking printer flags of the printers are set. A driver of a printer from the company B 8040 at the fifth in the printer list is newly installed and the high-ranking printer flag of the printer is set. The driver status is also updated at the same time. In such a manner, device drivers which has not been installed among the device drivers corresponding to the recognized peripheral devices can be installed with the set limit quantity being the upper limit of the installed device drivers.

Figure 11:
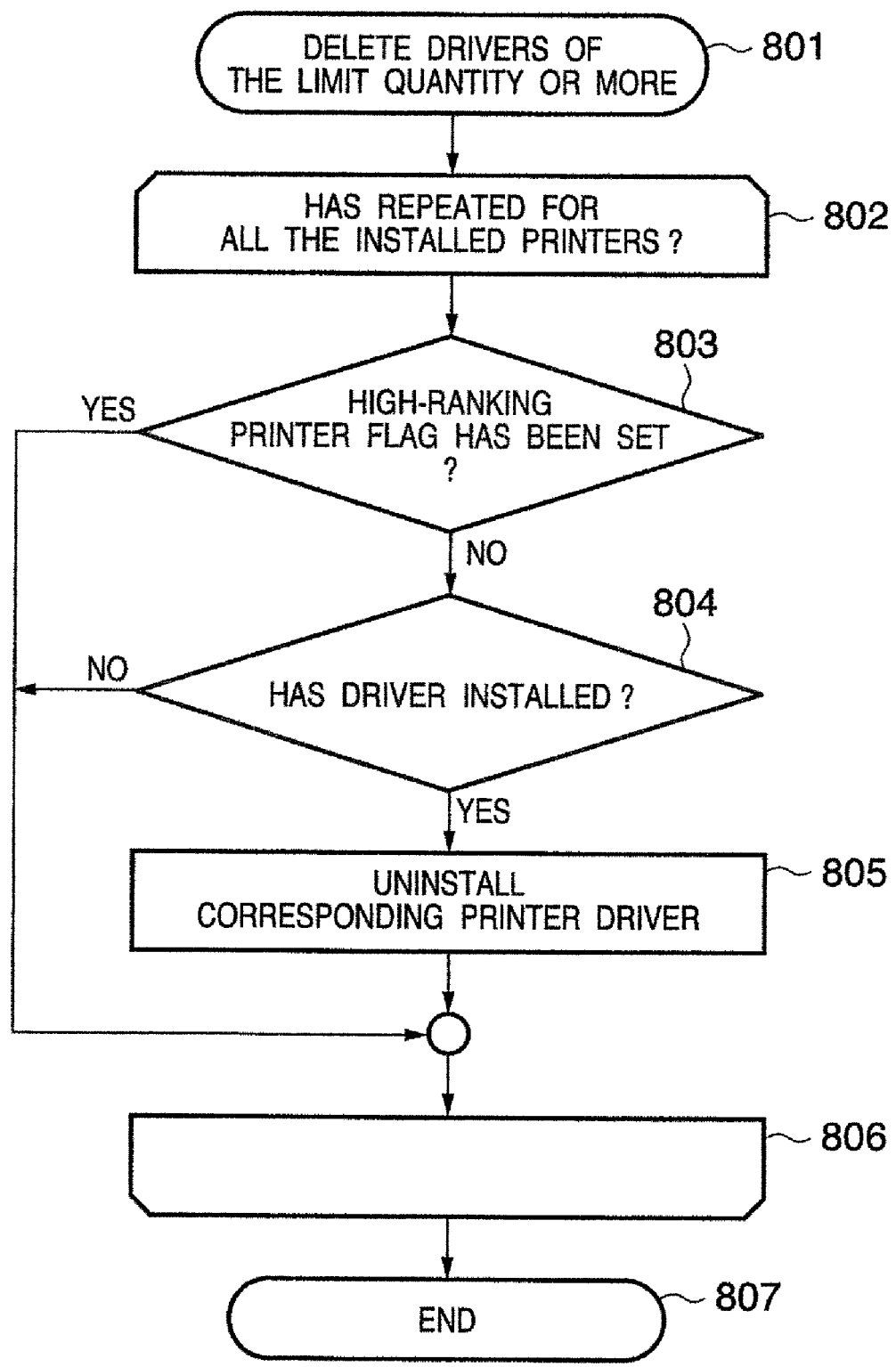
FIG. 11 is a flowchart when drivers exceeding the limit quantity are deleted.

FIG. 11 shows details of the step 800 for deleting drivers of the limit quantity or more in FIG. 7. Here, the client 1000 checks whether or not the high-ranking printer flag has been set when the driver is installed for each installed printer. That is to say, it references a high-ranking printer flag and a driver status in order from the high-ranking printer in the printer list 1801. Next, the client 1000 determines whether or not the high-ranking printer flag is not set and also the driver status is "Installed" (803, 804). That is to say, the processing is a processing for determining whether or not a device driver corresponding to the peripheral device whose set priority is not included in the limit quantity is installed. For example, in a case where the limit quantity is three, a peripheral device to which priority of four and under is set corresponds to a peripheral device whose set printer ranking is not included in the limit quantity,. The client deletes printer driver for a printer whose priority is not included in the limit quantity based on determination processing at the step 803 and the step 804 (805). With the processing, if a device driver corresponding to the set peripheral device with a printer ranking not included in the limit quantity have been installed, the device driver is deleted (uninstalled). The driver which is not installed is not to be deleted, thus, determination at the step 804 is not needed. After the task is performed, the upper limit quantity, which is specified by a user with the UI 1102 of FIG. 4, of drivers are installed.

As such, with the processing of FIG. 11, as a driver corresponding to a device with a printer ranking not included in the set upper limit number is set is automatically uninstalled (deleted), a memory amount which has been wasted by a driver unwanted by the user can be saved.

<Driver Install for all the Printers>

Figure 10:
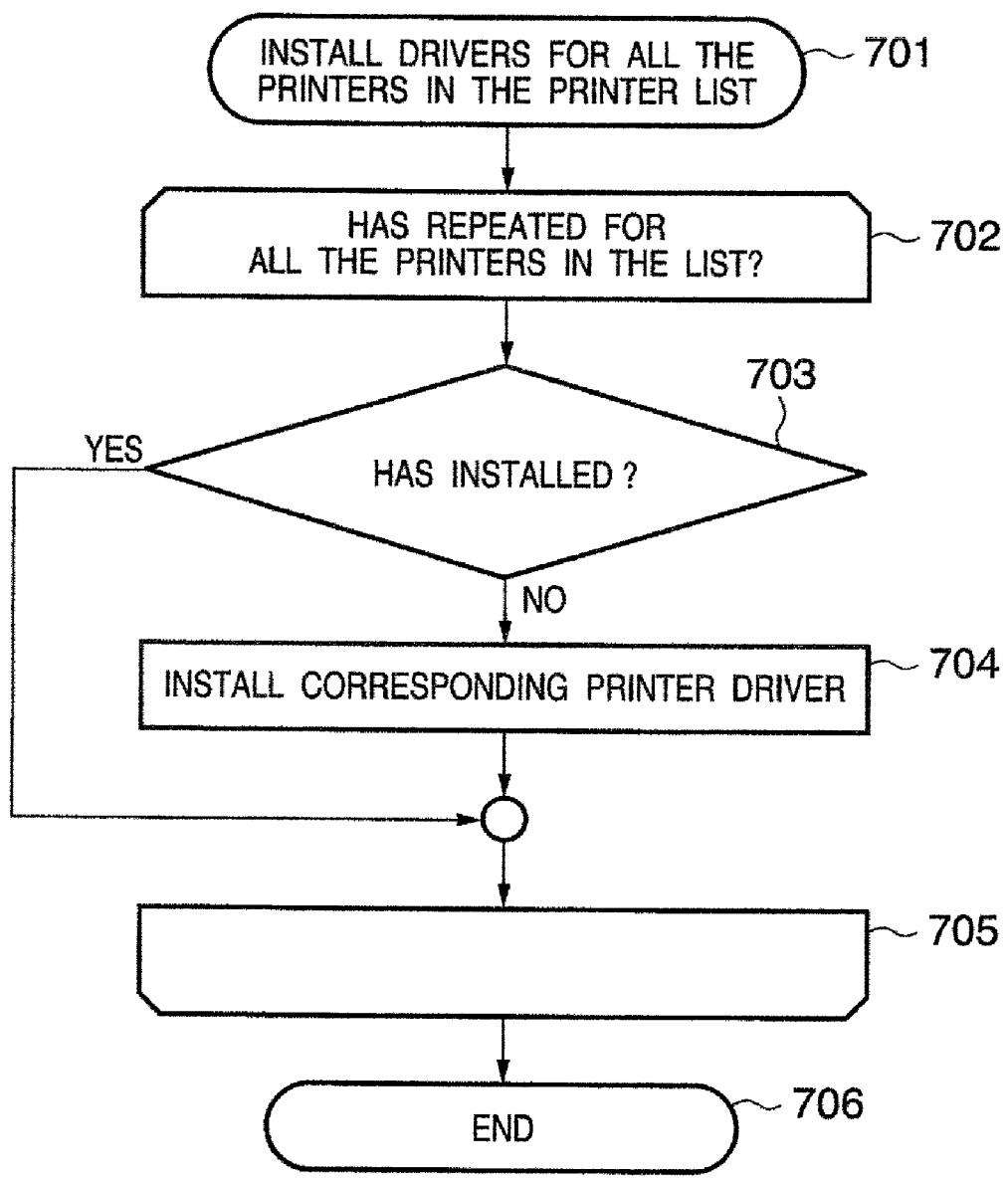
FIG. 10 is a flowchart when drivers for all the printers are installed.

FIG. 10 shows details of the step 700 of installing drivers for all the printers in the printer list of FIG. 7. The client 1000 focuses on the printers in the printer list in order and determines whether or not the printer driver for the focused printer has been installed (703). If it is determined that it is not installed by the determination at the step 703, the client 1000 installs the printer driver of the focused printer (704). The tasks are repeated for all the printers on the printer list (702).

<Driver Install Which is Triggered by Connection Notification from a Device>

Figure 12:
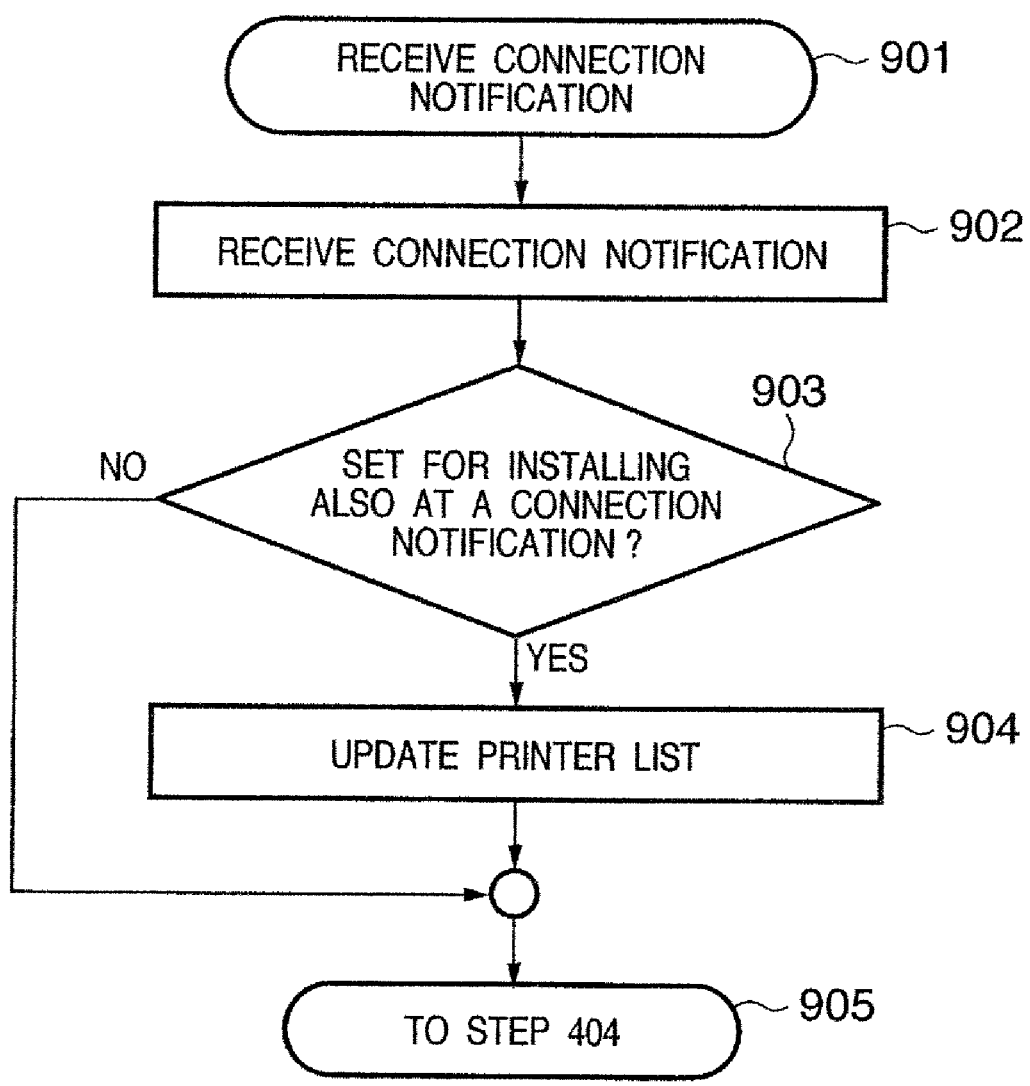
FIG. 12 is a diagram showing operation of a client when a notification of connecting to a network (Hello) is arrived from a printer.

From FIG. 7 to FIG. 11, flows of request for searching (Probe request) from the client 1000 have been described. In contrast, a flow shown in FIG. 12 shows an operation of the client 1000 when a connection notification for connecting to the network 31 is arrived from the network printer 3000. The Hello notification is performed when a power of the device connected to a network is switched on or when a new device is newly connected to a network.

When the client 1000 receives a connection notification, which is predetermined signals, from a peripheral device (902), it determines whether or not it is set for installing a driver for a corresponding printer also at a notification of connection (903). The determination at the step 903 can be performed as the printer leading flag 1714 indicating whether or not "install (uninstall) also at printer connection notification" 105 is checked in the UI 100 of FIG. 4 is referenced. The connection notification indicates a connection starting signal from the peripheral device which can be communicated with the client 1000.

If it is set to install at a time of notification of connecting a network printer, a printer which issued a connection notification is added to the printer list. If it matches with condition information 1006*a* set by the UI of FIG. 5, a driver corresponding to the added printer is installed. Therefore, at the step 904, the client 1000 sends the device information request message 1912 and the service information request message 1914 to a printer which is a source of a connection notification as in FIG. 19B. Then the client 1000 receives information on the peripheral device which sent the connection notification, for example, attributes such as the printer name and configuration information and adds them to the printer list (904).

Then the processing branches to the step 404 of FIG. 7 for installing a driver based on the finally created printer list. Thereafter, the client 1000 decides a device ranking of the peripheral device from information on the peripheral device which sent the connection notification and attribute information for deciding priority of FIG. 5 and determines whether or not the decided device ranking is within the limit quantity. Next, as a result of the determination, if it is determined that the device ranking of the peripheral device which is a source of the connection notification fulfils the limit quantity, a device driver corresponding to the peripheral device is installed. That the device ranking fulfils the limit quantity means that, if the limit quantity is three, peripheral devices to which a device ranking of the third or under are set.

If it receives the connection notification a network, it may create the entire printer list again. In such a case, it calls the entire of the printer search request of FIG. 7 instead of the step 904. If it does not branch to the step 404 and the printer search request ends, it is a matter of course that the processing of FIG. 12 also ends.

It is assumed that a new device is connected to a network where device drivers by the limit quantity are stored in a set device ranking based on a predetermined condition, with the processing of FIG. 12. In such a case, a driver corresponding to the device can be installed as pieces of information on connected devices are captured and given a device ranking within the set limit quantity. As a device which has issued a connection notification is arranged by the device ranking within the limit quantity, a ranking of a device which had been within the limit quantity until the connection notification was issued is excluded from the limit quantity. In such a case, at least a device driver may be uninstalled (deleted) from device drivers which have been installed.

With the operation, a driver for the high-ranking printer requested by the user is always kept being installed on the client 1000 if the user specifies the limited number of drivers.

<Message to a User>

Figure 13:
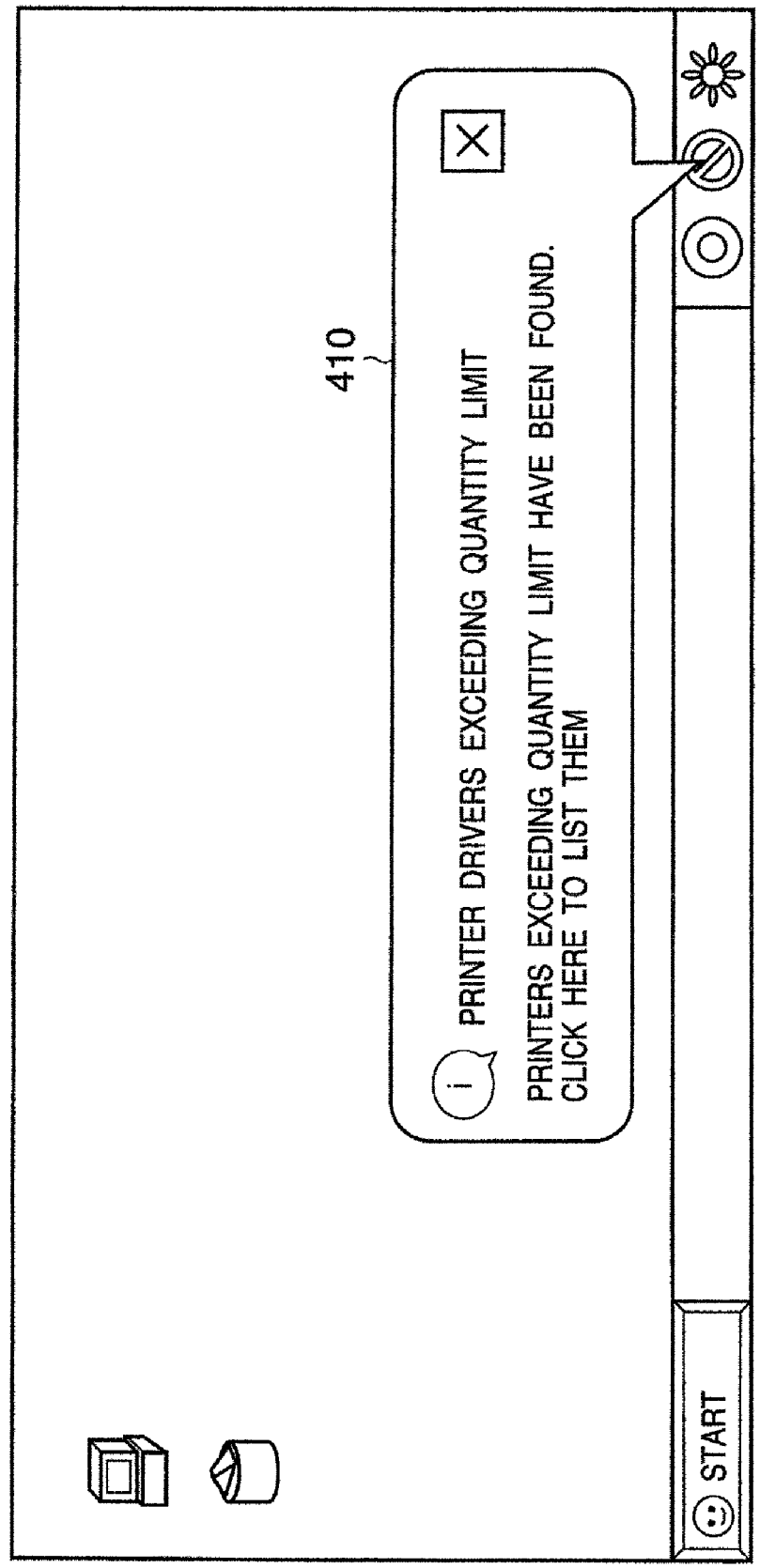
FIG. 13 is a diagram showing an example of a UI for asking whether the detected printers are listed or not.
Figure 14:
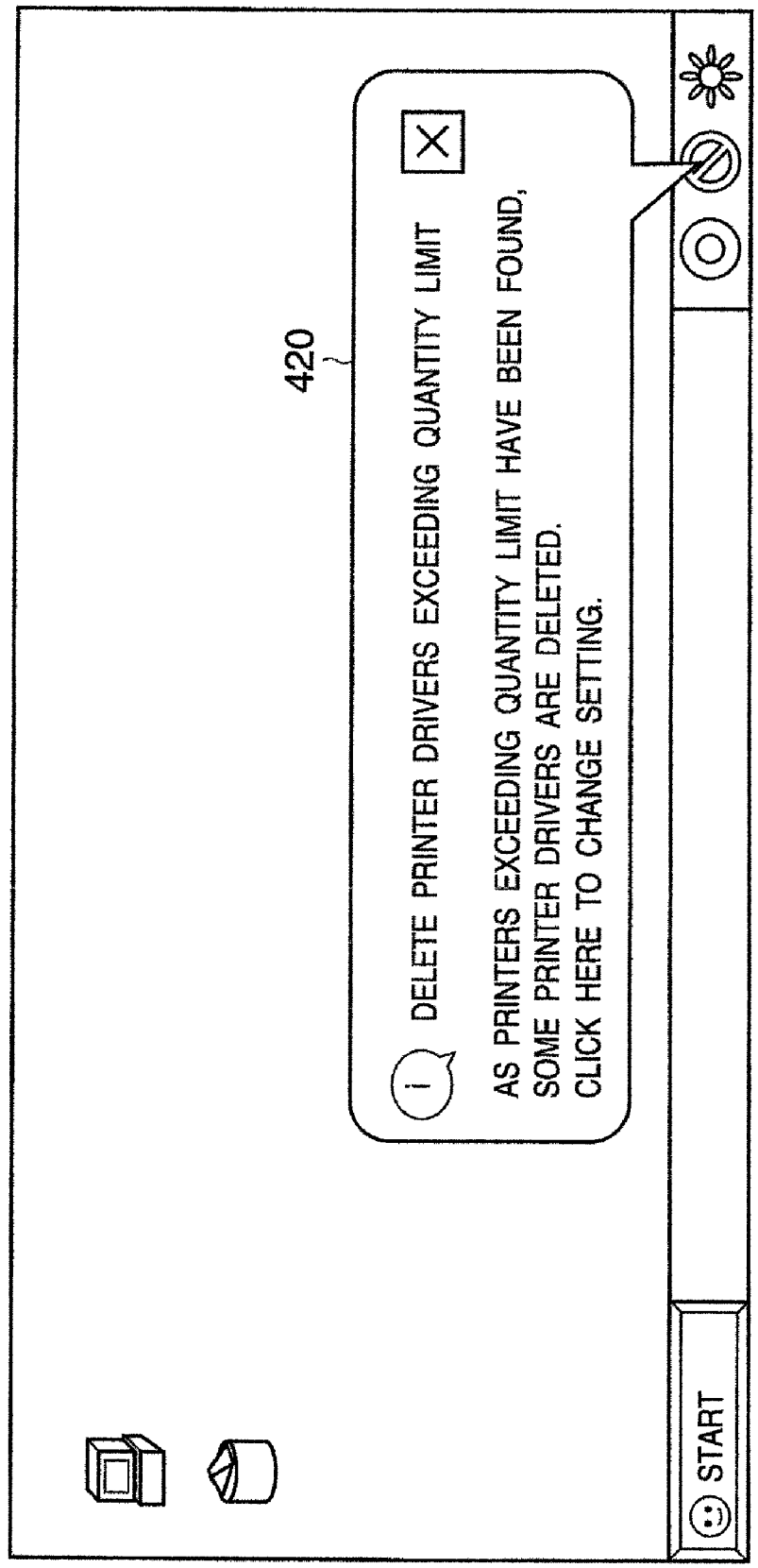
FIG. 14 is a diagram showing an example of a UI displayed when automatic uninstall is executed.

FIG. 13 and FIG. 14 show examples of a user notification of FIG. 7 (step 407) displayed by an UI on the CRT 10 of the client. The UI 410 of FIG. 13 is an UI for asking a user whether or not printers exceeding the quantity limit are to be listed if they are found. The UI 420 of FIG. 14 is an UI for displaying some printer drivers after they are automatically uninstalled when printers exceeding the quantity limit are found. An UI when they are listed is detailed in FIG. 15. It is adapted to lead a user to a setting screen (FIG. 4) by one click in consideration of a user who does not want automatic uninstallation.

FIG. 15 shows an UI displayed when a user specifies to display a list of printers connected to a network at FIG. 13. The screen is equivalent to the UI screen of the PnP utility 1002. The screen is prepared to specify whether to install or to uninstall a driver corresponding to a printer in a network with an operation on the UI.

In a list section 5100 of the upper section of the network printer, a printer list 1501 sorted in the order of device rankings specified by a user is displayed as a result of the flow of FIG. 8. It has an add button 5300 for instructing a printer driver which has not been installed to be installed or a delete button 5400 for uninstalling a printer driver which has been installed. A button for updating list 5200 is prepared for searching a printer connected to a network again along with a flow of FIG. 7.

On the other hand, in the lower section 5500, attributes of printers selected at the printer list 1501 are displayed. The attributes is provided for a user so that the user can recognize the printers currently connected to the network.

As described above, according to the embodiment, if a plurality of network printers are present, a client connected to the network can install printer drivers only for the specified number of network printers which match with specified conditions. That can reduce the consumption of resources of a client computer. That also narrows the range of printer choice to be used by a user to improve operability.

The conditions can be specified by adding a priority to each item of configuration information such as printer functions, frequency of use, time passed after install. For example, if a device ranking is set by using the frequency of use, a device ranking higher than the ranking of printers used at a frequency equivalent to or lower than a predetermined value set by the user is set to a printer used at a frequency exceeding the predetermined value. Alternatively, based on the frequency of use (for example, in a descending order of the frequency of use), devices may be ranked. Accordingly, the user can install a driver in favor of a desired printer by giving the highest priority to the item that the user considers it the most important.

When a printer suited to a condition specified by a user is newly added, a printer whose printer driver is to be installed is dynamically selected so that the printer can be quickly used from the client.

In addition, network plug and play enables a printer to be used without requiring a user to do a task such as driver installation or the like to improve the operability and the productivity.

Second Embodiment

In the first embodiment, the specified upper limit is regarded as the upper limit of already installed printer drivers. The installation of a printer driver is performed using the specified upper limit. For example, if the specified upper limit is five and three printer drivers have been installed, the number of printer drivers which can be installed is two.

Figure 20:
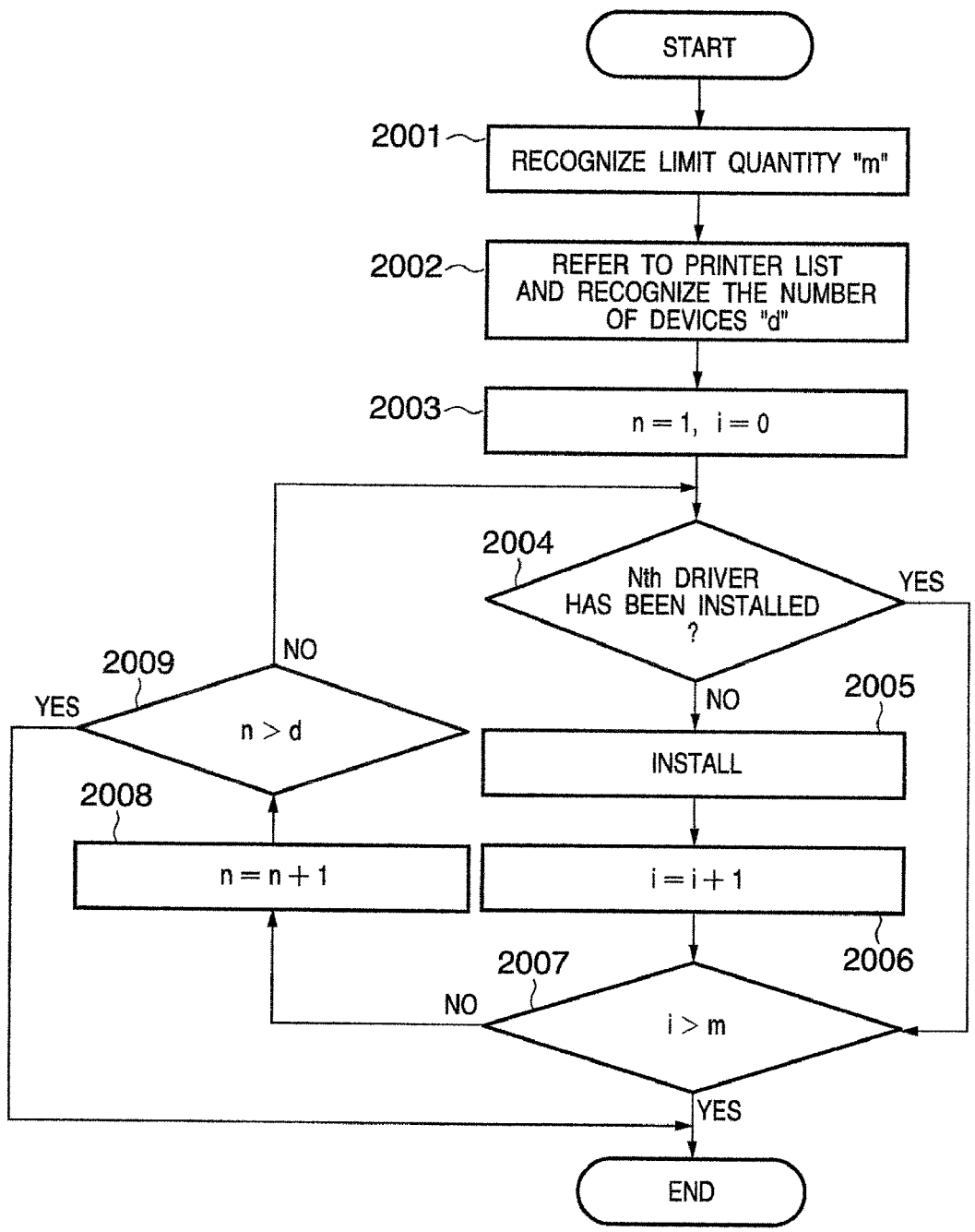
FIG. 20 is a flowchart of a second embodiment.

On the other hand, in the second embodiment, the processing for installing printer drivers by the set limit quantity will be described. For example, the processing for installing five printer drivers even when the limit quantity is designated as five and three printer drivers have been installed will be described with reference to FIG. 20.

The client 1000 reads the set limit quantity "m" (2001). Next, the client 1000 refers to the abovementioned printer list of FIG. 18 and reads the number of listed devices "d" (2002). Specifically, the number of printers registered in the printer list is counted. In the example of FIG. 18, d=10.

The client 1000 initializes the list number "n" to be determined to one for proceeding the determination from the first device on the list. As the client 1000 counts the number of device drivers subject to install, it initializes the number of installed device drivers "i" to zero (2003).

The client determines whether or not a driver corresponding to the $n^{th}$ printer on the printer list has been installed (2004). The determination processing on whether the driver has been installed or not is as mentioned above.

If the processing at the step 2004 determines that the driver corresponding to the $n^{th}$ printer has been installed, the client proceeds to the processing at 2007.

If the processing at 2004 determines that the driver corresponding to the $n^{th}$ printer has not been installed (2004—No), the client 1000 installs the driver corresponding to the $n^{th}$ printer (2005). The client 1000 increments the value "i" indicating the number of installed drivers by one in order to count the number of installed printer drivers (2006).

The client compares the number of installed printer drivers "i" and the limit quantity "m" read by the processing at the step 2001. If it is determined that the number of installed printer drivers "i" is bigger than the limit quantity "m" (2007—Yes), the client 1000 ends the processing described in FIG. 20.

If it is determined that the result of processing at the step 2007 is No, the client 1000 performs incrementing processing for proceeding the targeted printer to the next printer (2008). The client 1000 determines whether or not the $n^{th}$ printer to be processed is present in the printer list (2009), and if it is determined as present, the processing at the step 2004 is executed again.

With the abovementioned processing, the limit quantity of printer drivers by the user can be installed, while the installed printer drivers are taken into account. Therefore, many kinds of printer drivers can be installed, while the number of printer drivers to be installed is limited.

[Modification]

Although the printer drivers have been described, the present invention can be applied to the devices other than a printer. The present invention can also be applied to multiple kinds of devices respectively. In such a case, the upper limit to be installed, attribute information and its setting values which will be a key for device rankings, an uninstall option of a driver and the like are set for each device. That is to say, the install condition information 1006a shown in FIG. 17 is prepared for each device. As for the limit quantity, the limit quantity of the device driver to be installed is stored for each kind of peripheral devices. As mentioned above, peripheral devices include a printer.

In the embodiment, it is assumed that a device holds a configuration information database and the client obtains the configuration information from the device. In contrast, the device may be adapted to hold a location address of the configuration information database in order to save storage for holding the configuration information database and to centralize the management. In such a case, the device sends the address of the configuration information database (for example, an URI) to the client as a response, in response to a request for device information. The client who received that performs a request of configuration information for the address included in the response message. The procedure of acquiring configuration information is the same as that of FIG. 19 except for that an opposite side of the communication changes to a server for holding the configuration information database after the response for the device information request is received.

Further in the embodiment, the client obtains configuration information of a device from the device as device information in the procedure of the WS-Discovery. In contrast, the client can obtain configuration information of the device by using the SNMP, an active directory or the like. If the SNMP is used, the hard disk 29 of a device saves an SNMP (single network management protocol) agent and an MIB (management information base). The SNMP agent is loaded into the RAM 22 and executed by the CPU 21. The MIB is a database which saves statistic information or function information of a device (in this case, a printer). The SNMP agent updates the MIB or reads information on the MIB and sends it to an SNMP manager, in response to a request from a SNMP manager installed in a host computer. In the MIB, a frequency of use of the device, a print speed, the presence of a color print function, the highest resolution, the presence of a double-sided print function, manufacturer and the like, for example, are registered. Among the abovementioned items, the frequency of use is updated each time the printer is used. For the other items, values according to the models of the printers are registered at the time of manufacturing.

In such a manner, the client directly acquires device information from the device by the SNMP manager. Alternatively, a server which functions as the SNMP manager can be adapted to collectively acquire device information and the client can be adapted to acquire device information from the server.

Although the embodiments of the present invention have been detailed with reference to the drawings, a specific configuration of the present invention is not limited to the embodiments.

In the present invention, a device driver to be installed is decided as the set limit quantity being the upper limit. For example, as the top four drivers have been installed in FIG. 18, the remaining device driver which can be installed is one. The present invention is not limited to that, however, and merely device drivers by the set limit quantity may be installed.

Description of the embodiments and what is claimed is will be associated with each other below.

A WSD module for executing the step 402 of FIG. 7 has a recognition function of a peripheral device. Steps 600, 700 of FIG. 7 correspond to an install controlling step of installing a device driver. The client 1000 for executing that, particularly the PnP controller 1006 corresponds to the install controlling means.

Steps 402, 403 of FIG. 7 correspond to the peripheral device recognizing step of providing a recognition function for recognizing a connected peripheral device. The WSD module 1003 corresponds to the peripheral device recognizing means.

The step 500 of FIG. 7 corresponds to the ranking step of giving priority to recognized peripheral devices based on predetermined attribute information. The PnP controller which executes that corresponds to the ranking means.

The user interfaces of FIG. 4, FIG. 5 correspond to the specifying means for a user to specify attribute information.

Steps 803, 804 of FIG. 11 correspond to the determining means/step for determining whether a device driver corresponding to a peripheral device at a ranking not included in the limit quantity is installed or not based on the ranking set by the ranking means.

If the determining means determines that a device driver corresponding to a peripheral device at a ranking which falls short of the limit quantity is installed, the step 805 of FIG. 11 corresponds to the uninstall controlling means/step for uninstalling the determined device driver.

The step 902 of FIG. 12 and receiving of the connection notification 1911 of FIG. 19B correspond to a first receiving means/step for receiving a first signal issued by the peripheral device.

The step 403 of FIG. 12 and receiving of the FIG. 19B device information 1904 correspond to the second receiving means/step for receiving information on a peripheral device which is an issuer of the first signal.

The step 405 of FIG. 7 and the steps 602, 606 of FIG. 9 correspond to determining means/step for determining whether priority of the peripheral device set based on information on a peripheral device received by the second receiving means and predetermined conditions fulfills the limit quantity or not.

If the determining means determines that priority of the peripheral device fulfills the limit quantity, the step 700 of FIG. 7 and the step 604 of FIG. 9 correspond to the install controlling means/step for installing a device driver corresponding to a peripheral device.

The user interface 100 of FIG. 4 and the user interface 200 of FIG. 5 correspond to the setting means for setting attribute information for deciding a device driver to be installed.

The step 500 of FIG. 7 corresponds to the priority ranking means/step for setting priority of a device driver based on the attribute information set by the setting means.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-253795 filed on Sep. 1, 2005, which is hereby incorporated by reference herein in its entirety.

What is claimed is:

1. An information processing apparatus which has a recognition function for recognizing connected peripheral devices and can make the connected peripheral devices available, comprising:
   a holding unit adapted to hold an upper limit of device drivers to be installed, wherein the upper limit indicates the number of device drivers which is allowed to be installed;
   a ranking unit adapted to give priorities to respective peripheral devices recognized by said recognition function based on attribute information; and
   an install controlling unit adapted to install device drivers corresponding to the recognized peripheral devices whose priorities given by said ranking unit are within the upper limit held by said holding unit,
   wherein said ranking unit is adapted to give, when a new peripheral device is recognized by said recognition function, priority to the new recognized peripheral device, and
   wherein said install controlling unit is adapted to (i) not install a device driver corresponding to the new recognized peripheral device when the priority of the new recognized peripheral device is not within the upper limit held by said holding unit based on the priorities of the new recognized peripheral device and the peripheral devices corresponding to the installed device drivers, but (ii) install the device driver corresponding to the new recognized peripheral device when the priority of the new recognized peripheral device is within the upper limit held by said holding unit based on the priorities of the new recognized peripheral device and the peripheral devices corresponding to the installed device drivers.

2. The information processing apparatus according to claim 1, wherein said install controlling unit installs a device driver which is not installed among device drivers corresponding to peripheral devices recognized by said recognition function.

3. The information processing apparatus according to claim 1, further comprising a recognition unit adapted to provide a recognition function of recognizing the connected peripheral devices.

4. The information processing apparatus according to claim 1, wherein said recognition function acquires information on the connected peripheral devices, and said install controlling unit decides candidates for device drivers to be installed based on the information on the peripheral devices acquired by said recognition function with the upper limit held by said holding unit, and installs a device driver which is not installed among the decided candidates for device drivers.

5. The information processing apparatus according to claim 1, further comprising a specifying unit for a user adapted to specify said attribute information.

6. The information processing apparatus according to claim 1, wherein said holding unit holds the upper limit of the device drivers to be installed for each kind of the peripheral device.

7. The information processing apparatus according to claim 1, wherein said peripheral devices include a printer.

8. The information processing apparatus according to claim 1, wherein said ranking unit gives higher priority to a peripheral device corresponding to an installed device driver than priority of a peripheral device corresponding to a not-installed device driver with an installed attribute being said attribute information.

9. The information processing apparatus according to claim 1, wherein said ranking unit gives priority based on a frequency of use with a frequency of use attribute being attribute information.

10. The information processing apparatus according to claim 1, wherein said ranking unit gives higher priority to a peripheral device having a specified function than priority of the peripheral devices having no specified function with a function attribute being attribute information.

11. A control method of an information processing apparatus which has a recognition function for recognizing connected peripheral devices and can make the connected peripheral devices available, comprising:
    a holding step of holding the upper limit of device drivers to be installed, wherein the upper limit indicates the number of device drivers which is allowed to be installed;
    a ranking step of giving priorities to respective peripheral devices recognized by said recognition function based on attribute information; and
    an install controlling step of installing device drivers corresponding to the recognized peripheral devices whose priorities given by said ranking step are within the upper limit held by said holding step,
    wherein said ranking step gives, when a new peripheral device is recognized by said recognition function, priority to the new recognized peripheral device, and
    wherein said install controlling step (i) does not install a device driver corresponding to the new recognized peripheral device when the priority of the new recognized peripheral device is not within the upper limit held by said holding step based on the priorities of the new recognized peripheral device and the peripheral devices corresponding to the installed device drivers, but (ii) installs the device driver corresponding to the new recognized peripheral device when the priority of the new recognized peripheral device is within the upper limit held by said holding step based on the priorities of the new recognized peripheral device and the peripheral devices corresponding to the installed device drivers.

12. The control method of an information processing apparatus according to claim 11, wherein said install controlling step installs a device driver which is not installed among device drivers corresponding to peripheral devices recognized by said recognition function.

13. The control method of an information processing apparatus according to claim 11, further comprising a recognition step of providing a recognition function of recognizing the connected peripheral devices.

14. The control method of an information processing apparatus according to claim 11, wherein said recognition function acquires information on the connected peripheral devices, and said install controlling step decides candidates for device drivers to be installed based on the information on the peripheral devices acquired by said recognition function with the upper limit held by said holding step, and installs a device driver which is not installed among the decided candidates for device drivers.

15. The control method of an information processing apparatus according to claim 11, further comprising a specifying step of a user to specify said attribute information.

16. The control method of an information processing apparatus according to claim 11, wherein said holding step holds the upper limit of the device drivers to be installed for each kind of the peripheral device.

17. The control method of an information processing apparatus according to claim 11, wherein said peripheral devices include a printer.

18. The control method of an information processing apparatus according to claim 11, wherein said ranking step gives higher priority to a peripheral device corresponding to an installed device driver than priority of a peripheral device corresponding to a not-installed device driver with an installed attribute being said attribute information.

19. The control method of an information processing apparatus according to claim 11, wherein said ranking step gives priority based on a frequency of use with a frequency of use attribute being attribute information.

20. The control method of an information processing apparatus according to claim 11, wherein said ranking step gives higher priority to a peripheral device having a specified function than priority of the peripheral devices having no specified function with a function attribute being attribute information.

21. A computer-readable recording medium storing thereon a computer-executable program for causing a computer with a recognition function for recognizing connected peripheral devices to make said peripheral devices available, the program comprising:

codes of a holding step of holding an upper limit of device drivers to be installed, wherein the upper limit indicates the number of device drivers which is allowed to be installed;

codes of a ranking step of giving priorities to respective peripheral devices recognized by said recognition function based on attribute information; and codes of an install controlling step of installing device drivers corresponding to the recognized peripheral devices whose priorities given by said ranking step are within the upper limit held by said holding step, wherein said install controlling step (i) does not install a device driver corresponding to the new recognized peripheral device when the priority of the new recognized peripheral device is not within the upper limit held by said holding step based on the priorities of the new recognized peripheral device and the peripheral devices corresponding to the installed device drivers, but (ii) installs the device driver corresponding to the new recognized peripheral device when the priority of the new recognized peripheral device is within the upper limit held by said holding step based on the priorities of the new recognized peripheral device and the peripheral devices corresponding to the installed device drivers.

* * * * *